US011207579B2

(12) United States Patent
Horwath

(10) Patent No.: US 11,207,579 B2
(45) Date of Patent: Dec. 28, 2021

(54) ROBOTIC GOALKEEPER SYSTEMS AND METHODS

(71) Applicant: Joseph Patrick Horwath, Sunnyvale, CA (US)

(72) Inventor: Joseph Patrick Horwath, Sunnyvale, CA (US)

( * ) Notice: Subject to any disclaimer, the term of this patent is extended or adjusted under 35 U.S.C. 154(b) by 0 days.

(21) Appl. No.: 16/558,117

(22) Filed: Sep. 1, 2019

(65) Prior Publication Data

US 2020/0114231 A1    Apr. 16, 2020

Related U.S. Application Data

(60) Provisional application No. 62/867,542, filed on Jun. 27, 2019, provisional application No. 62/726,216, filed on Sep. 1, 2018.

(51) Int. Cl.
*A63B 63/06* (2006.01)
*A63B 63/00* (2006.01)
*G09B 19/00* (2006.01)

(52) U.S. Cl.
CPC ............ *A63B 63/06* (2013.01); *A63B 63/004* (2013.01); *A63B 2225/09* (2013.01); *G09B 19/0038* (2013.01)

(58) Field of Classification Search
CPC . A63B 63/004; A63B 63/06–2063/065; A63B 63/008; A63B 69/002; A63B 69/0024–0026
USPC ................................................. 248/214–215
See application file for complete search history.

(56) References Cited

U.S. PATENT DOCUMENTS

| | | | | |
|---|---|---|---|---|
| 3,765,675 A | * | 10/1973 | DiMarzio | A63B 63/06 473/446 |
| 4,168,062 A | | 9/1979 | McCarthy | |
| 5,498,000 A | * | 3/1996 | Cuneo | A63B 63/06 273/407 |
| 5,582,404 A | | 12/1996 | Parzino | |
| 5,776,019 A | | 7/1998 | Kronenberger | |
| 5,928,093 A | * | 7/1999 | Lai | A63B 69/34 473/430 |
| 6,736,739 B1 | * | 5/2004 | Epworth | A63B 63/004 473/443 |
| 6,796,914 B2 | | 9/2004 | Berdugo | |
| 8,277,340 B1 | * | 10/2012 | Devine | A63B 69/0071 473/447 |
| 10,213,670 B2 | | 2/2019 | Adams | |

(Continued)

FOREIGN PATENT DOCUMENTS

| | | | | | |
|---|---|---|---|---|---|
| CA | | 2377756 A1 | * | 6/2003 | ............. A63B 69/36 |
| DE | 202006014876 U1 | | * | 8/2007 | ........... A63B 63/004 |

OTHER PUBLICATIONS

English machine translation of DE 202006014876 U1 (Year: 2007).*

*Primary Examiner* — Laura Davison

(57) ABSTRACT

Apparatuses that each include at least one body and are configured to move relative to an entrance of goal to form an obstruction. The apparatuses either operate autonomously or have a remote operator and their bodies can be moved in coordination with players, pucks, balls or other object of interest. The apparatuses also each include a removably attachable actuating support. The actuating supports of each are mechanically linked to the body, removably attachable to goals, and in operable communication either a teleoperator or autonomous controller.

15 Claims, 26 Drawing Sheets

(56) References Cited

U.S. PATENT DOCUMENTS

| | | | | |
|---|---|---|---|---|
| 2006/0273521 | A1* | 12/2006 | Nash | A63B 71/02 273/407 |
| 2010/0328644 | A1* | 12/2010 | Lu | G01S 17/86 356/5.01 |
| 2014/0011612 | A1* | 1/2014 | Trombley | A63B 63/06 473/446 |
| 2017/0036083 | A1* | 2/2017 | Trombley | A63B 69/34 |

* cited by examiner

Enlarged View -AA

Enlarged View -BB v)

vi)

ROBOTIC GOALKEEPER SYSTEMS AND METHODS

CROSS-REFERENCE TO RELATED APPLICATION

This application claims the benefit of provisional patent application Ser. No. 62/726,216, filed Sep. 1, 2018, which is incorporated by reference in its entirety.

This application claims the benefit of provisional patent application Ser. No. 62/867,542, filed on Jun. 27, 2019, which is incorporated by reference in its entirety.

BACKGROUND

The following is a tabulation of some prior art that presently appears relevant:

U.S. Patents

| Pat. No. | Kind Code | Issue Date | Patentee |
|---|---|---|---|
| 4,168,062 | A | 1979 Sep. 18 | McCarthy et al |
| 5,582,404 | A | 1996 Dec. 10 | Parzino |
| 5,776,019 | A | 1998 Jul. 7 | Kronenberger |
| 6,796,914 | B2 | 2004 Sep. 28 | Berdugo et al. |
| 10,213,670 | B2 | 2019 Feb. 26 | Adams |

The present disclosure relates generally to systems and methods that use robots with sports, specifically sports that have goalkeepers in competitive play. The ability of human goalkeepers to adjust their positioning relative to a puck, ball, player, etc. ("Object of Interest") provides a myriad of challenges for shooters. The level of player entertainment and engagement increases when shooters are challenged by goalkeepers. Because players in the position of goalkeeper are the minority, it is often very difficult to find goalkeepers for every situation. Further, for those practicing at home, playing in very small groups or living in remote areas, often a goalkeeper is not available.

In the absence of human goalkeepers (or goalkeepers of commensurate skill), players primarily turn to one of two options: shooting on empty nets or setting up inanimate objects in nets. Both solutions are not ideal for skill development, entertainment, or competition because they do not simulate the dynamic interactions typical of a human goalkeeper and player.

Apparatuses having mechanical actuation and proposed for use as net obstructions have been proposed, for example McCarthy et al. U.S. Pat. No. 4,168,062 (1979), Parzino U.S. Pat. No. 5,582,404 (1996), Kronenberger U.S. Pat. No. 5,776,019 (1998) and Berdugo et al. U.S. Pat. No. 6,796,914 (2004).

However, these disclosures suffer from one or more of these disadvantages: high cost, lack of portability, requirement of specific nets, difficulty of emplacement, and no means to correlate actuation with the movement of objects in their surroundings.

McCarthy et al. detailed a goalkeeper comprised of a lower section and an upper section having actuating pivoting arms. It has several disadvantages: the majority of the apparatus is stationary, the motion of its arm's does not have the means to correlate with the motion of players or pucks and it is difficult to move and emplace in a net.

Parzino detailed a goalkeeper with a body that rides on wheels and a frame that attaches to a net and articulates said body in an arcuate motion. This apparatus does not provide the means to correlate the motion of said body to the motion of pucks or players and the frame lacks the means for simple or removable emplacement on nets.

Kronenberger similarly detailed a goalkeeper with a body and a frame that attaches to a net and articulates said body in either an arcuate or linear motion. This apparatus does not provide the means to autonomously correlate the motion of the body to the motion of pucks or players and the frame lacks the means for easy emplacement on nets.

Berdugo et al. detailed a goalkeeper with a body, a track and a base where said body moves on said track in correlation with a puck/ball having a transmitter. This apparatus has several disadvantages: the puck or ball must have a transmitter and are thus more expensive than generic pucks or balls and the track can interfere with shots that are low to the ground.

Adams details an apparatus having panels with apertures that can be fastened proximate net openings. The apertures have the means to open and close challenging shooters to aim for an open aperture. Because the apparatus detailed by Adams is planar the correct shooting dynamic between player and goalkeeper is missing. The apparatus also lacks the means to correlate it's movement with objects in its surroundings.

BRIEF SUMMARY OF THE INVENTION

Aspects of this invention provide the methods and apparatuses that serve as robotic goalkeepers whereby movements of the robotic goalkeepers are configured to reduce the probability that a player can shoot an object into the net unimpeded. The robotic goalkeepers either operate autonomously or have a remote operator. Autonomous robotic goalkeepers prioritize and localize Objects of Interest in their surroundings and move in response to the location and/or trajectory of those Objects of Interest. The invention disclosed herein provides a means to vastly improve a player's experience in the absences of a human goalkeeper.

Advantages

Accordingly, several advantages of one or more aspects are as follows: a robotic goalkeeper that can function autonomously and coordinate its movement based on the movement of the object of play providing for a more enjoyable and more realistic game simulation, controllability by a remote operator to coordinate its movement based on the movement of the object of play, easy attachment to a net, easy detachment from a net, adjustability to fit a particular net, usability on multiple types of surfaces, movability of a body in an arcuate motion, rapid movement of its body, accurate positioning of its body in its movement range, and an ability to withstand high impact forces. Other advantages of one or more aspects will be apparent from a consideration of the drawings and ensuing description.

BRIEF DESCRIPTION OF THE DRAWINGS

Non-limiting and non-exhaustive embodiments of the present disclosure are described with reference to the following figures wherein like reference numerals refer to like parts throughout the various figures unless otherwise specified. For example, 104 and 104A refer to different embodiments of frames. The first digit of a reference numeral refers to the figure number in which the part first appeared.

DETAILED DESCRIPTION OF THE INVENTION

Description of Apparatus

Figure 1A:
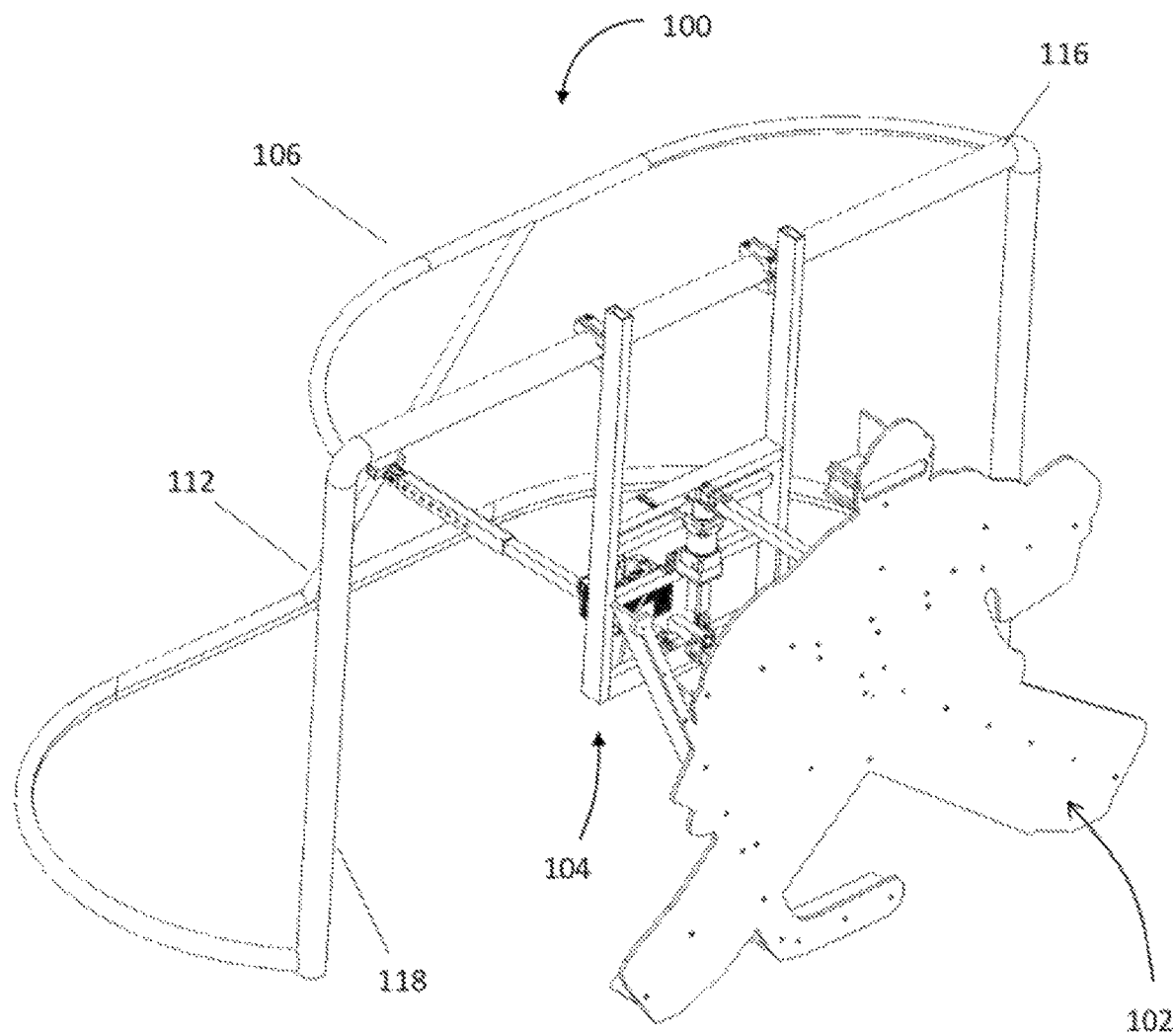
FIG. 1A a schematic depicting an embodiment of a Robotic Goalkeeper configured to position a body of a Robotic Goalkeeper to reduce a shooter's scoring chances.

Apparatuses and methods disclosed herein pertain to systems configured to act as robotic goalkeepers. "Robotic Goalkeeper" will refer to any apparatus configured to a reduce the probability that a player can shoot an object into the net unimpeded. Any goal frame typically manned in competition and utilized in any sport that acts to create a defined scoring boundary, where to score, an object of play must pass through the area defined by said scoring boundary will be referred to as a "Sports Goal Frame". Examples include ice hockey goal frames, roller hockey goal frames, lacrosse goal frames, field hockey goal frames, etc. "Objects of Interest" will refer to objects that are or may be important for goalkeepers, such as players, sticks and objects of play (such as pucks or balls). Because an object's importance to a goalkeeper depends on the circumstance, it may also refer to other objects such as skates, hands, etc.

Robotic Goalkeepers disclosed herein are comprised of, at a minimum, a body, an actuating support, a processing system and at least one of a teleoperation system and/or a perception system. A body is any impact resistant contrivance that may be utilized to partially obstruct the opening of a Sports Goal Frame. An actuating support is a structure that links to a body and a Sports Goal Frame and has the means of moving said body with respect to a Sports Goal Frame. A processing system refers to any electrical system that a Robotic Goalkeeper may use to coordinate its movement or position with its state, based on information received from either or both a perception system and/or a remote operator. A perception system refers to any system that can gather information from the surroundings of a Robotic Goalkeeper for information about Object(s) of Interest. A teleoperation system refers to any system that can receive commands from remote operator(s) and transmit said commands to a processing system.

Autonomous Robotic Goalkeepers disclosed herein may utilize perception systems and processing systems to prioritize and localize Object(s) of Interest in their surroundings and move in response to the location and/or trajectory of those Object(s) of Interest without requiring an input from an operator.

A perception system is comprised of, among other components, sensors and the necessary electronics to transmit sensor data to a processing system. A perception system useful for a Robotic Goalkeeper described herein can take a plurality of forms, such as a camera, a depth camera, ultrasonic sensors, infrared transmitters and receivers, etc. A perception system may be configured such that it may determine the relative distance between Objects of Interest and a Robotic Goalkeeper permitting a teleoperator or a processing system extensive contextual understanding of the scene detected by said perception system. Information collected by a perception system is also valuable for users shooting on a Robotic Goalkeeper. Thus, a perception system may be connected to an internal or external device capable of storing and saving data collected by a perception system.

In the following description, reference is made to the accompanying drawings that are incorporated herein, and in which is shown by way of illustration specific exemplary embodiments in which the disclosure may be practiced. These embodiments are described in enough detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense. Listings of manufacturers or vendors provided throughout this description should not be taken in a limiting sense as one skilled in the art would appreciate there are a plurality of options. Further, although the embodiments in the accompanying drawings are configured to act as hockey goalkeepers, they could easily be configured for other sports (e.g., field hockey, lacrosse, etc.); therefore, the sport selected for any embodiments should not be taken in a limiting sense.

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which includes one or more executable instructions for implementing the specified logical function(s).

Description of an Embodiment of the Apparatus:

FIG. 1A is a perspective view depicting an embodiment of a Robotic Goalkeeper 100 configured to autonomously position itself relative to a shooter. An actuating support 104 of the Robotic Goalkeeper has a central open rectangular structure where at the base of the rectangle components bidirectionally extended normal to the plane of the rectangular structure. The ice hockey Sports Goal Frame shown has a crossbar 116 joined by ninety-degree elbows to front goal posts 118 and stabilized by rear goal post 112. A "hockey goalkeeper shaped" rigid impact resistant polymer body 102 mounts onto the actuating support, contacts the ground via wheels and extends upwards to approximately the height of the net. The actuating support 104 stabilizes the body 102 vertically while also providing a vertical axis of rotation.

Figure 1B:
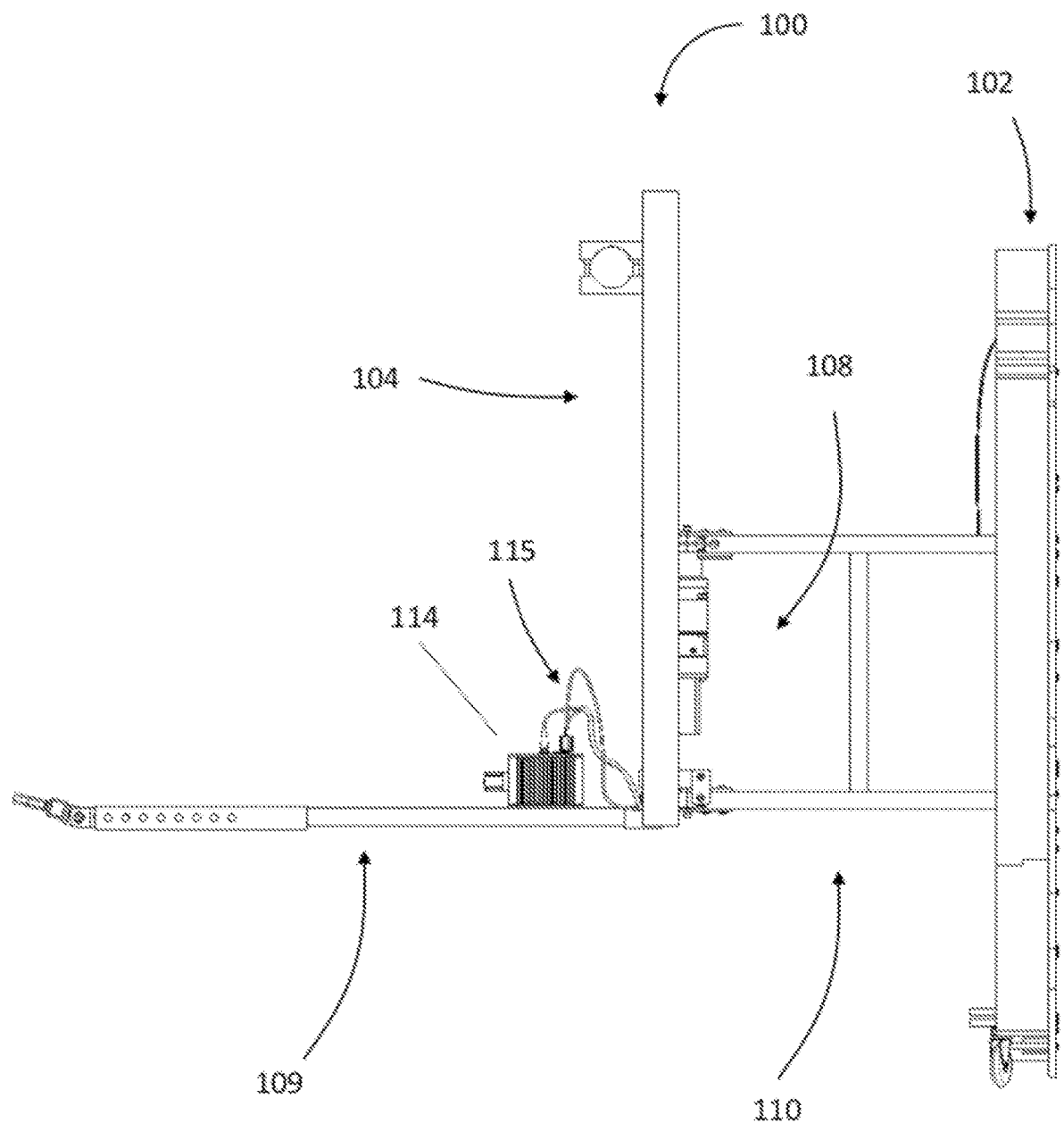
FIG. 1B a schematic depicting a side view of an embodiment of a Robotic Goalkeeper.

FIG. 1B is a schematic depicting a side view of the Robotic Goalkeeper 100 with the actuating support 104, the body 102, an inline drive system 108, swing arm assembly 110, a telescoping rear support assembly 109, a processing system enclosure 114, and wiring harnesses 115. The inline drive system 108 is mechanically coupled with a swing arm assembly 110 to manipulate the positioning of the body. The swing arm assembly is shaped like a counter-clock wise ninety degree rotated "H" where the bridge of the "H" stabilizes the assembly. One set of uprights is pivotally attached to the actuating support and the other is affixed to the body such that actuation causes the body to rotate on an axis of rotation defined by the horizontal length of the assembly. Thus, the swing arm assembly constitute a means for connecting to the body 102. The inline drive system 108 is electrically coupled with a processing system enclosure 114 via electrical wiring harnesses 115. The telescoping rear support assembly 109 supports the processing system enclosure and mechanically affixes to the rest of the actuating support 104.

Figure 1C:
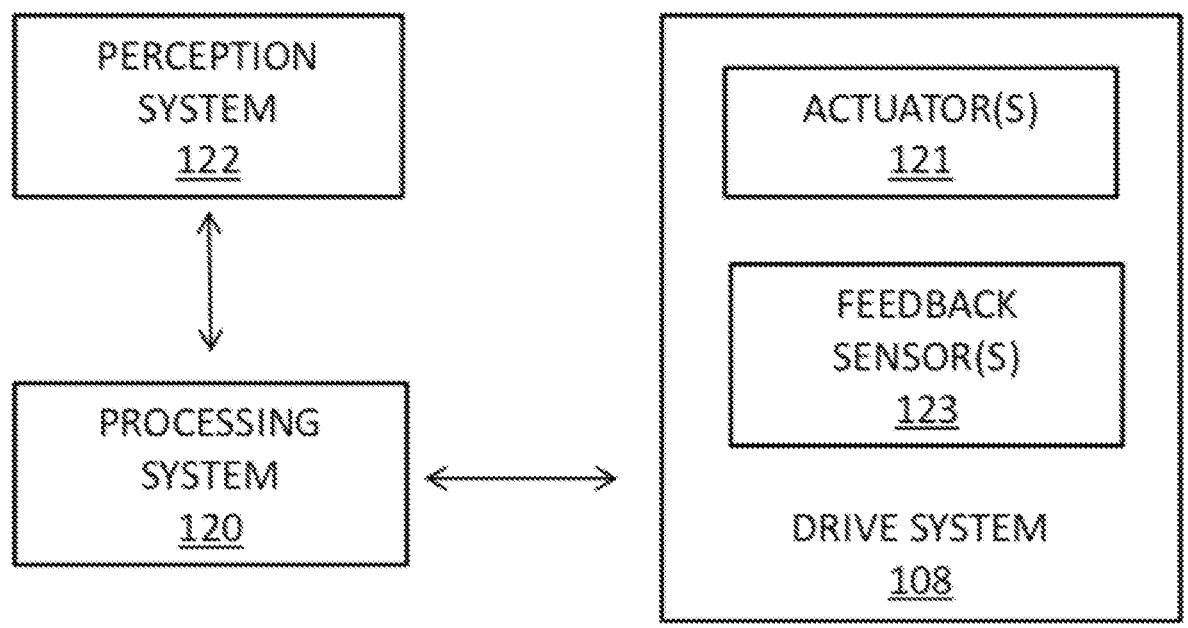
FIG. 1C a block diagram depicting an electric coupling of an embodiment of a Robotic Goalkeeper between a perception system, a processing system and a drive system.

FIG. 1C is a block diagram depicting a bidirectional electrical coupling of a processing system 120 with a perception system 122 and a drive system 108 that may be utilized in an embodiment of a Robotic Goalkeeper, such as 100. The perception system 122 collects and transmits real-time data of the surrounding environment to the processing system. If Object(s) of Interest are in the field of view of the perception system, the processing system may autonomously detect, track, and direct via commands the drive system 108 to proportionally position or move the body relative to the Object(s) of Interest. The drive system depicted is comprised of actuator(s) 121 and feedback sensor(s) 123. The drive system executes commands issued to it by the processing system to control the actuator(s) 121 and returns information from the feedback sensors 123 to the processing system.

Figure 1D:
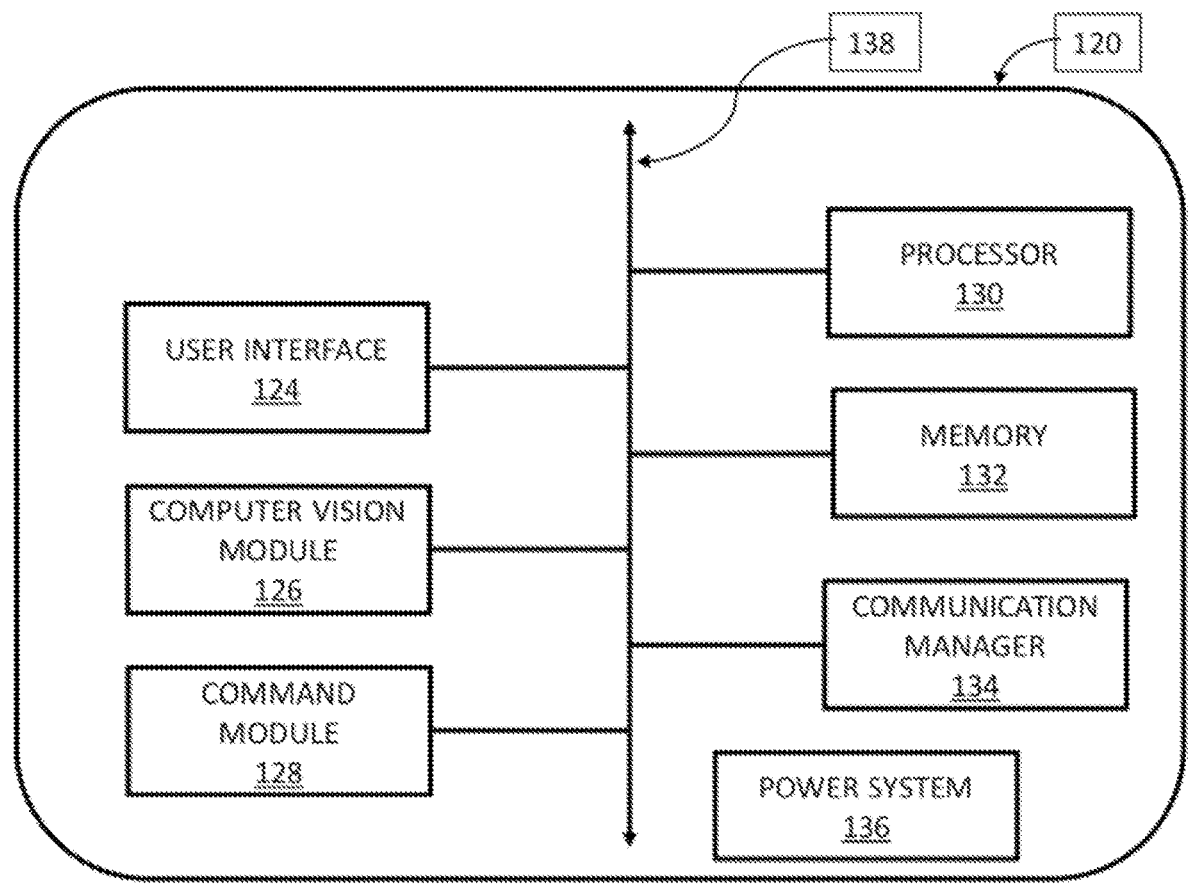
FIG. 1D a block diagram depicting an embodiment of a processing system that may be used to implement certain functions of a robotics system configured to position a body of a Robotic Goalkeeper to reduce a shooter's scoring chances.

FIG. 1D is a block diagram depicting an embodiment of a processing system 120 that may be used to implement certain functions of Robotic Goalkeeper 100 configured to autonomously operate. A user interface 124, a processor 130, memory 132, a power system 136, and a data bus 138 form a foundation for the processing system. With this foundation, the other components of the processing system 120, (including a computer vision module 126, a command module 128, and a communication manager 134 may process data received from the perception system 122 to control a drive system, such as 108. The functions of each individual block of the processing system embodiment depicted in FIG. 1D will be described.

Processing system 120 includes a data bus 138 where the data bus is a high bandwidth interconnected data route connecting electrically coupled components. Data bus 138 interconnects the processing system components and interlinks the perception system 122 and drive system 108 to the processing system. For example, data received from the perception system 122 may be transmitted via the data bus into the computer vision module 126. The results from the computer vision module 126 may then be passed to the command module 128 where the results are processed into commands and transmitted to a drive system, such as 108.

Processing system 120 includes the power system 136 where the power system consists of the necessary electronics to supply electrical power to components of the processing system at regulated voltages and amperages. The power system is configured to supply enough electrical power for a suitable amount of time to allow for the proper actuation of a drive system, such as 108. The power system 136 may be configured to run from the power of rechargeable batteries or a standard wall outlet. Alternative embodiments of a power system may be configured to run off only rechargeable batteries or only from wall power.

Processing system 120 includes memory 132 where the memory provides short-term and long-term data storage. Short term storage, for example, could consist of the temporary storage of perception system data while the computer vision module 126 processes data previously received from the perception system 122. The long-term memory may store firmware, such as the algorithms utilized by the computer vision module 126. In alternative embodiments of processing systems, the long-term memory may also store data obtained during use of a Robotic Goalkeeper, such as generic data received from a perception system or specific data from a perception system, such as profiles of Objects of Interest. The long-term memory may also store data important for training or retraining machine learning algorithms.

Processing system 120 includes the user interface 124, which may be configured to accept on/off, stop/start and reset commands generated via a pushbutton(s) located on a processing system enclosure, such as 114. The user interface may also be configured to accept, from a knob on a processing system enclosure, such as 114, commands to change the speed of operation of a Robotic Goalkeeper. The user interface 124 constitutes a means by which a user can select how well the robotic system coordinates the motion of a body with respect to the movement of Objects of Interest. The user interface 124 may also be configured for use in updating or repairing software or firmware of processing system. Alternative embodiments of the user interface may be configured with a setting constituting the means for an operator to select between autonomous and teleoperation operating modes.

Processing system 120 includes the processor 130 where the processor may be configured to perform generalized processing functions, arithmetic functions, and so on. The processor 130 is also configured to rapidly process large packets of input data (e.g., color images, etc.) using computationally expensive algorithms (e.g., artificial intelligence algorithms, image transformations, etc.). Processors with the necessary capabilities can be sourced from NVIDIA Santa Clara, CA; Intel Santa Clara, CA, or Broadcom, San Jose, CA.

Processing system 120 may include a communication manager 134 where the communication manager may manage communication protocols and associated communication with external peripheral devices as well as communication within other components in the processing system. For example, the communication manager 134 may be responsible for generating and maintaining the interface between processing system 120 and perception system 122. Data flow and algorithm execution within the processing system may be managed by the communication manager. For example, upon the receipt of new data from the perception system 122, the communication manager may route the data to the computer vision module 126 for processing; thus, initiating algorithms contained in the computer vision module. When the computer vision module has finished processing the data, the communication manager may route the results to the command module for further processing.

The command module 128 included in the processing system 120 may be responsible for generating and executing commands on the drive system, such as 108. It may be responsible for monitoring and storing the status of a drive system and any associated feedback sensors. The command module may be configured to protect a body and a drive system during actuation. The command module may be configured to actuate a drive system an appropriate amount (for alignment with a shooter) and at appropriate speed (as determined by the movement of Objects of Interest and/or operator settings). Depending on the embodiment of a Robotic Goalkeeper or a processing system, the command module may be configured to perform a plurality of tasks. In a Robotic Goalkeeper configured for teleoperation, for example, a command module may be responsible for executing commands issued via teleoperation and managing a drive system. It may report the statuses of the drive system and feedback sensors, may monitor the movement and position of a Robotic Goalkeeper, and may control the positioning of the Robotic Goalkeeper.

Figure 1E:
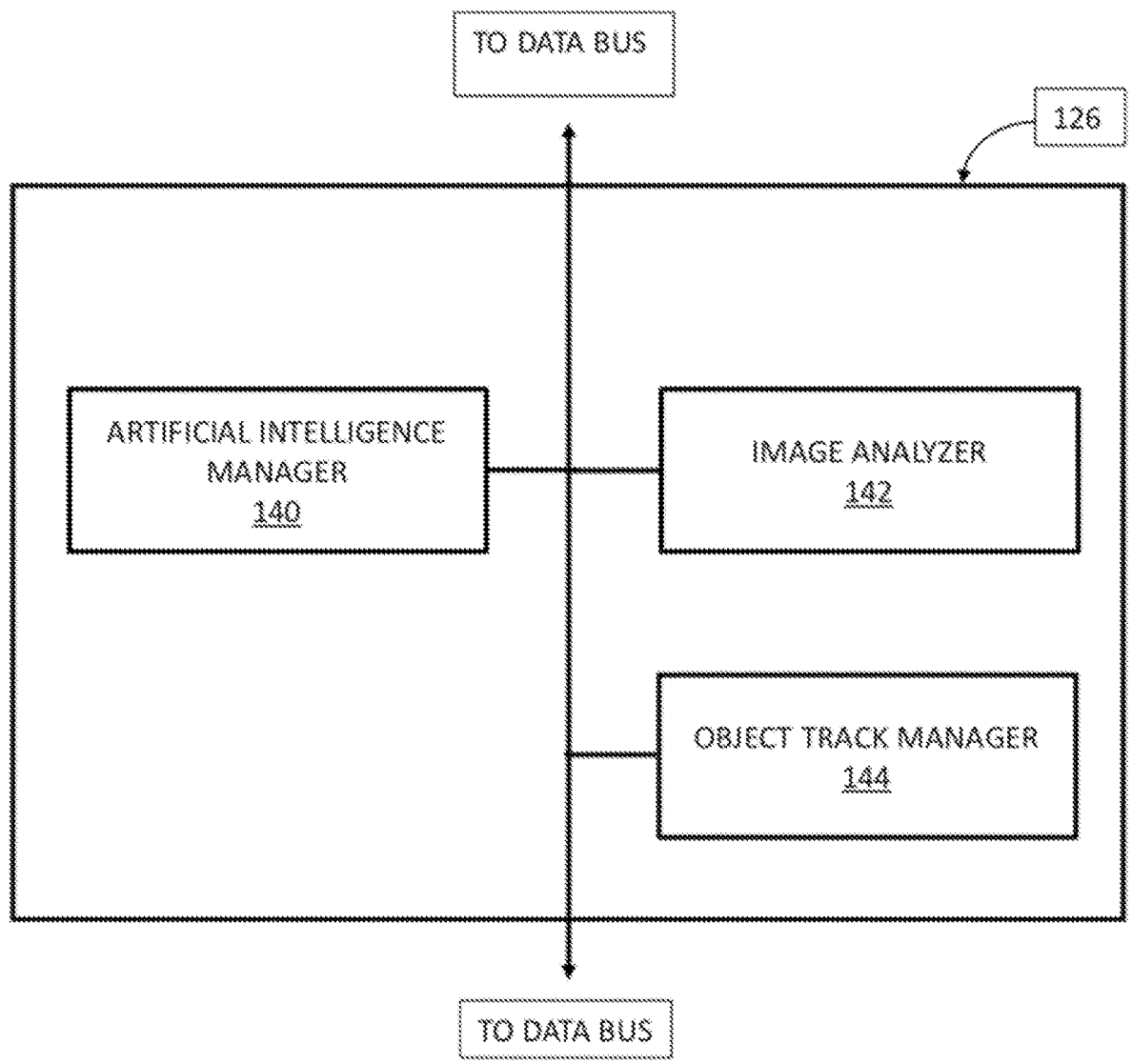
FIG. 1E a block diagram depicting an embodiment of a computer vision module.

FIG. 1E is a block diagram of the computer vision module 126 where the computer vision module 126 may be configured to process images and/or other data and determine the number and the location of Object(s) of Interest relative to the body 102 of the Robotic Goalkeeper 100. The module may be comprised of an artificial intelligence manager 140, an image analyzer 142 and object tracking manager 144. The artificial intelligence manager may implement artificial intelligence object detection algorithms to perform classification and localization. The image analyzer may utilize standard image processing techniques to detect motion. The artificial intelligence manager and the image analyzer may be configured to work together such that the computer vision module runs at a rapid enough pace on the processor 130 to capture the trajectory of fast moving Object(s) of Interest. The object track manager 144 may perform data association tasks by utilizing probabilistic algorithms including techniques to predict object positions. The object track manager may store information about the state of Object(s) of Interest over time e.g., position, size, color. Information from the object tracker may be routed to the command module 128 by the communication manger, via the data bus. Depending on the embodiment of a perception system and on the embodiment of a Robotic Goalkeeper the computer vision module may be substituted with modules configured to interpret data from non-vision-based sensors (e.g. ultrasonic speakers, lidar, etc.) either with or without vision-based data.

Figure 2A:
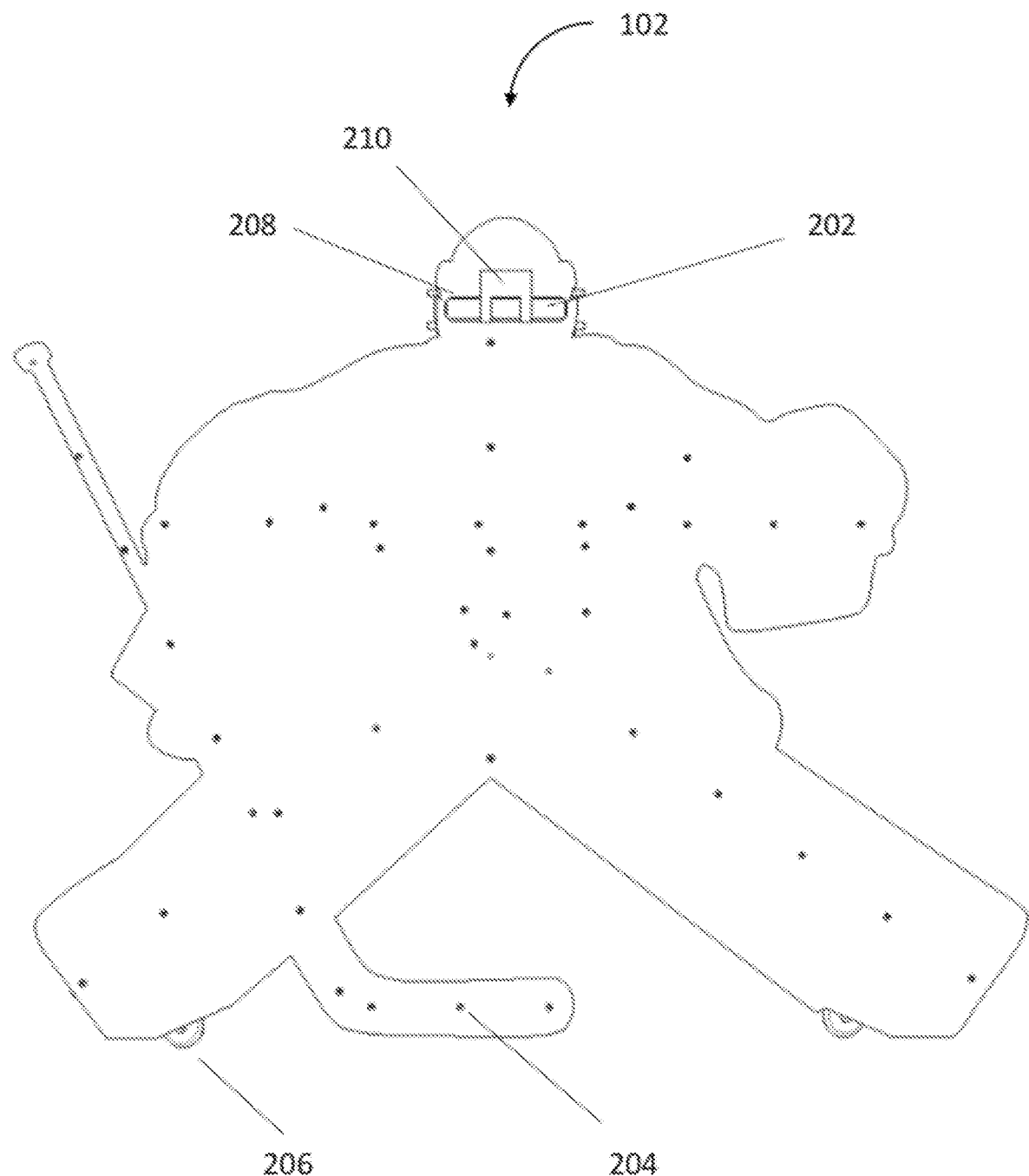
FIG. 2A a schematic depicting a front view of an embodiment of a body.

FIG. 2A is a schematic depicting a front view the body 102. The shape and dimensions of the body approximately match those of an adult ice hockey goalkeeper fully dressed in typically goalkeeper pads and in a crouched position. The body is approximately 48" tall with a maximum width of approximately 60". The body may be constructed from sheets of high-density polyethylene (HDPE), a material that has very high impact resistance. HDPE is easy to machine, weld, and form. It is relatively inexpensive, and sheets of adequate material properties are widely commercially available. The body may be fabricated by the cutting of a ~6.4 mm (~¼") HDPE sheet using a computer numerical control (CNC) router. The CNC router may be utilized to pre-drill clearance holes for assembly screws 204 that insert into the body (see FIG. 2B). The body rides on fixed casters 206 located such that the plastic body has a 6.4 mm-19 mm (¼"-¾") ground clearance. An oval cutout 208, is positioned at the top of the body and is used as a window for a stereo camera 202. To protect the stereo camera without blocking either vision sensor, an approximately 3" wide plastic shield 210 is positioned over the cutout 208. Note that because of the dimensions of the oval hole and the plastic shield, pucks or hockey balls shot at the body cannot make physical contact with the camera. Alternative embodiments of the body may be fabricated from a plurality of methods including thermoforming.

Figure 2B:
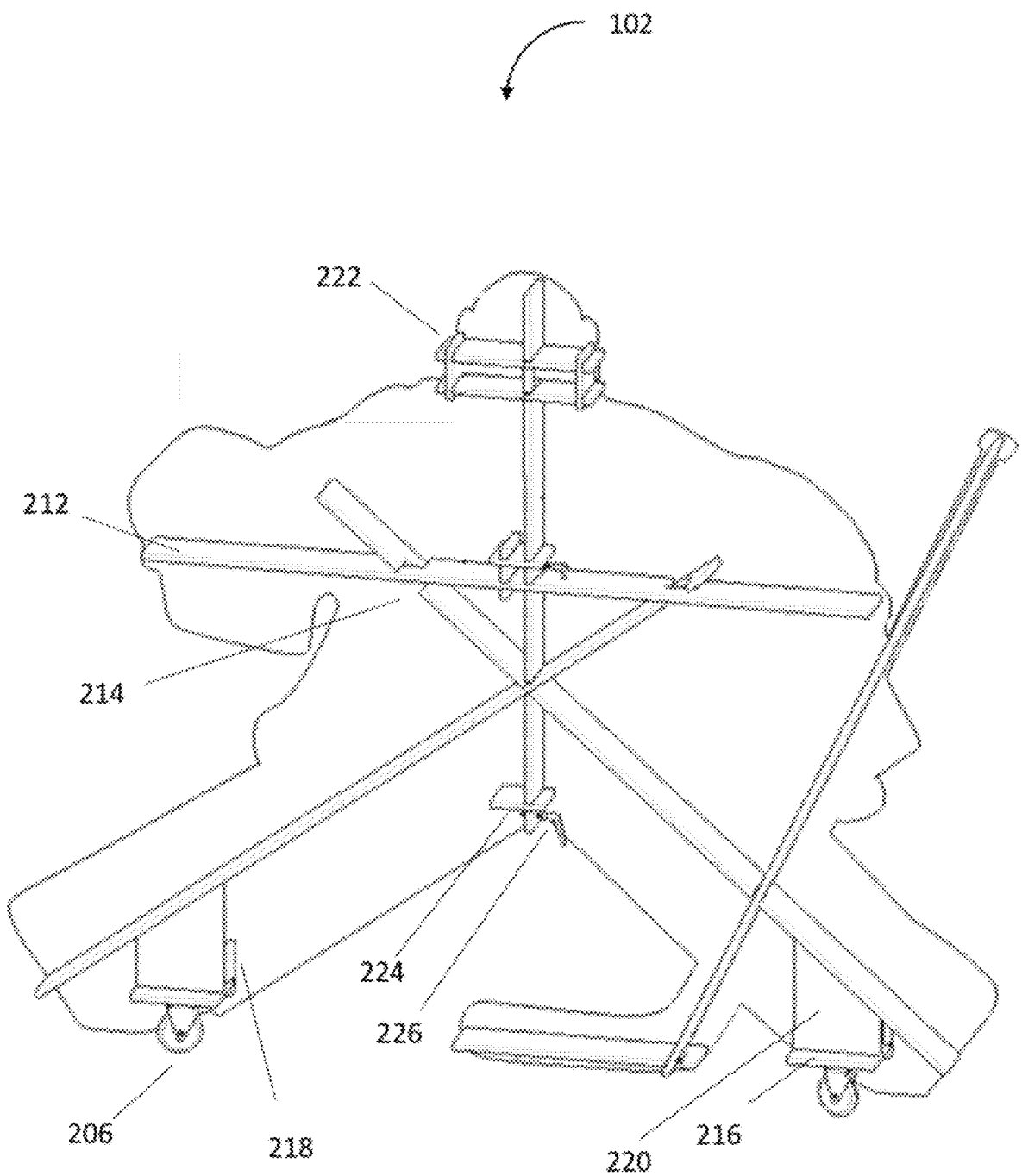
FIG. 2B a schematic depicting a perspective view of an embodiment of a body.

FIG. 2B is a schematic depicting a rear view of the body 102 of Robotic Goalkeeper 100 where numerous components are attached, by screws (see FIG. 2A), to the back of the body. These components may be fabricated quickly and precisely by using a CNC router to cut sheets of ~6.4 mm(~¼") thick HDPE. A series of crossing and interlocking rigidifying ribs 212 are utilized to rigidify the plastic body. The rigidifying ribs have notches 214 which allow them to interlock, span the full dimensions of the body and be mutually supporting. The rigidifying ribs 212 constitute a means for making the body rigid and impact resistant. Fixed casters 206 are supported by plates 216. The plates are held in place with caster support ribs 218 and standoffs 220. Because the swing arms rotate in a semi-circle when articulated by the drive system, the wheels of the body move along an arc. Thus, the fixed casters 206 should be rigidly attached to the plates at a specific angle to ensure smooth drag-free motion along the arc. The fixed casters 206 constitute a means for the smooth arcuate motion of the body. Camera support ribs 222 are assembled to provide a housing for the perception system. These ribs have notches allowing them to be mutually supportive and connect to the support ribs. Connection ribs 224 are notched and rigidly connected to rigidifying ribs. When the body is assembled to the actuating support, the swing arms are fixed to the body in place by the connection ribs and the rigidifying ribs. Body fasteners 226 slide through the rigidifying rib proximate the connection ribs. The body fasteners constitute a means for removably attaching the body to the swing arm assembly 110.

Figure 3A:
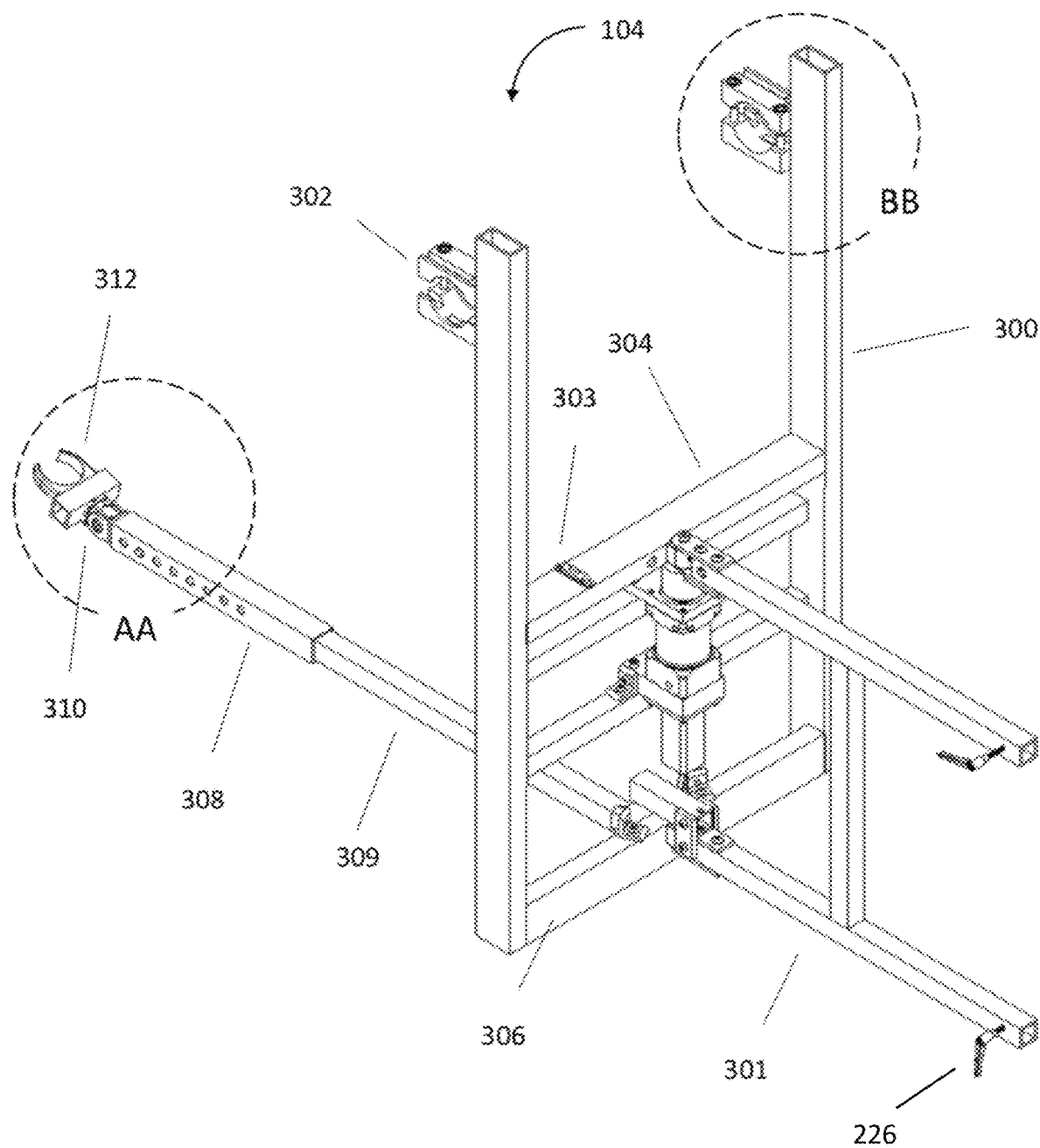
FIG. 3A a schematic depicting a perspective view of an embodiment of a frame.

FIG. 3A is a perspective view depicting the actuating support 104. The actuating support is primarily constructed of light weight load bearing members, such as vertical support 300, a top horizontal support, a bottom horizontal support, etc. Henceforth these elements, will be referred to as "Structural Members". The Structural Members may be constructed from commercially available 6000 series aluminum tubing with standard wall thicknesses having a square or rectangular shape. The tubing may be cut to length using a band saw and welded together to form an actuating support, such as actuating support 104.

The vertical supports 300 weld to crossbar clamps, such as 302 and are linked together by the top horizontal support 304 and the bottom horizontal support 306. The top and bottom horizontal supports connect to the swing arms 301. The bottom horizontal support also connects to a telescoping rear support inner tube 309. The telescoping rear support inner tube 309 slides into and fastens to the telescoping rear support outer tube 308. The telescoping rear support outer tube 308 connects to the rear pivot 310. The rear pivot 310 connects the outer tube to the rear clamp 312. Rear clamp 312 connects to a rear goal post (e.g. rear goal post 116). Note that there are two labeled circles of dashed lines; these indicate portions of the schematic that are show in enlarged views in a subsequent figure.

Sports Goal Frames from different manufacturers typically have different dimensions. Also, goal posts of different Sports Goal Frames are constructed from different starting components (e.g., ice hockey goal frame crossbars may be made of standard steel tube with a 2" outer diameter or standard steel pipe with a 2.315" outer diameter). The actuating support 104 is configured to handle variation in goal frame dimensionality using clamps and other "adjustable" components, such as the rear pivot 310 and the telescoping rear support assembly. The crossbar clamps 302 are configured to 2"-2.375" diameter crossbars. The pivot 310 and telescoping rear support 308 allow the actuating support to attach to dimensionally variant goal frames and square the actuating support to the front goal posts. Combined the crossbar clamps 302 and the telescoping rear support 308 constitute a means for the actuating support to removable affix to a Sports Goal Frame and accommodate dimensional variance. The rear post clamp maybe constructed from molded polypropylene plastic. The crossbar clamps may be made from commonly available 6000 series rectangular aluminum bar cut to length using a band saw and machined using a CNC. The bottom halves of the crossbar clamps may then be welded or fastened to the vertical supports.

Figure 3B:
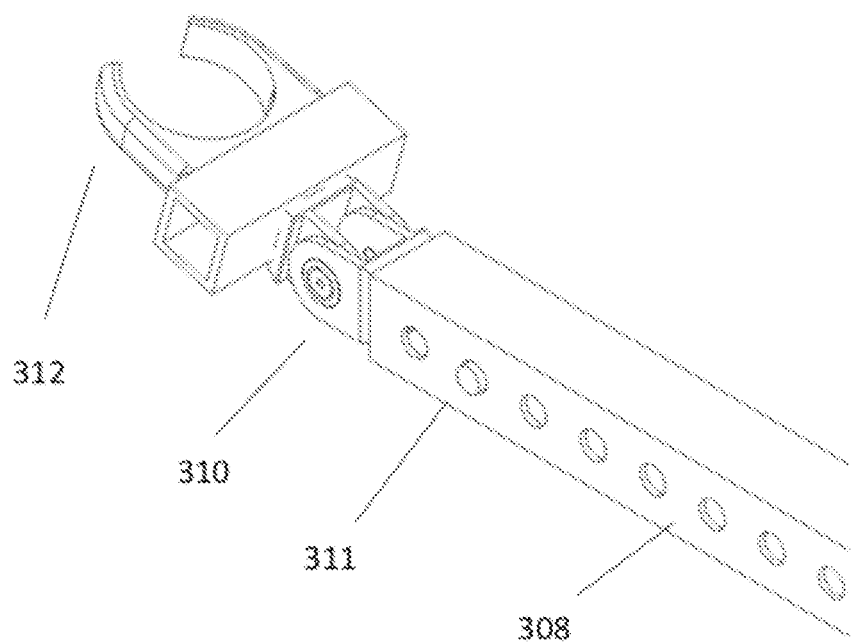
FIG. 3B a schematic depicting a perspective view of an embodiment of a frame.
Figure 3B:
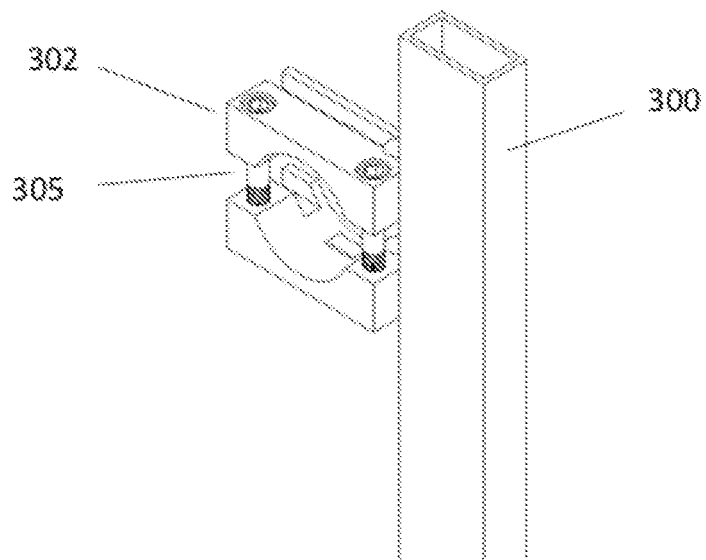
Figure 3C:
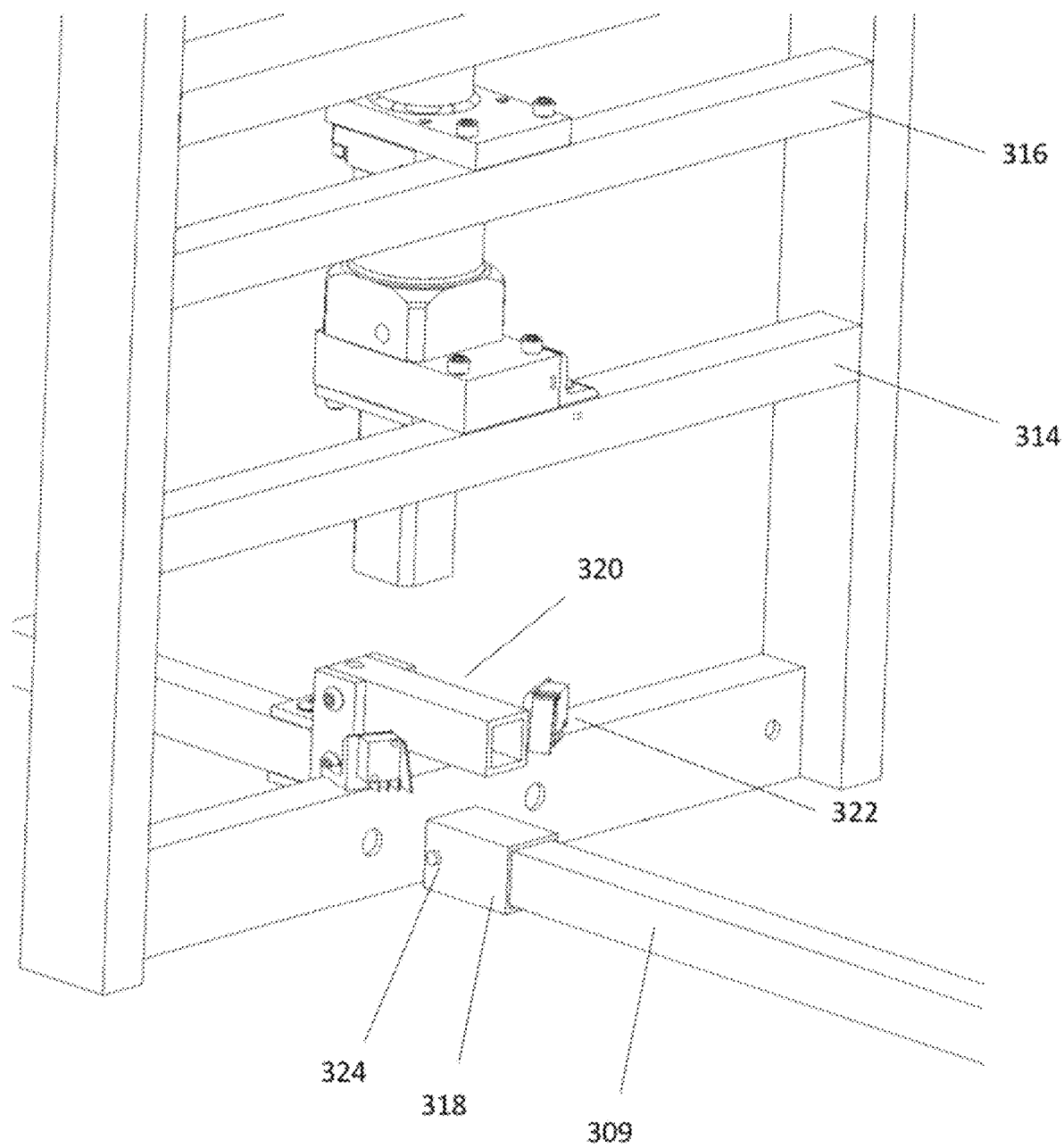
FIG. 3C a schematic depicting a perspective view of an embodiment of a frame and an embodiment of a drive system.

FIG. 3B is a schematic depicting the enlarged views AA and BB where a portion of the telescoping rear support assembly and the crossbar clamp are shown in more detail. In view AA a spring snap button connector 311 is shown protruding through a hole in the outer tube 308. The snap button connector is affixed to the inner tube 309. Note that the outer tube 308 has multiple holes and that the spring snap button may be moved into any of them. In view B-B clamp fasteners, such as 305 are depicted fastening the upper and lower half of the crossbar clamp 302 together. The fasteners allow adjustability for crossbars of varying diameters and rigidly affix crossbar clamps together. Note that the bottom half of clamp 302 may be welded to vertical support 300. P FIG. 3C is a schematic depicting a perspective view of the back of the actuating support. A horizontal motor support 314 and a horizontal gearhead support 316 weld to vertical supports 300. A socket 318 welded onto the bottom horizontal support and the rear telescoping support inner tube may snap into and out of the socket with use of spring snap button connector 324. "Limit Switches" refer to devices in a closed electric circuit configured to open (break) the electric circuit when bumped by an object. A limit switch bar 320 attaches to the lower swing arm and is configured to contact the limit switches 322 during its rotation. The limit switches are positioned to limit the degree of rotation of the swing arms and thus the body. The limit switches constitute a means for detecting the swing arm (when it is in contact) and communicating with the processing system. The limit switch bar may be manufactured from standard square aluminum tubing.

Figure 3D:
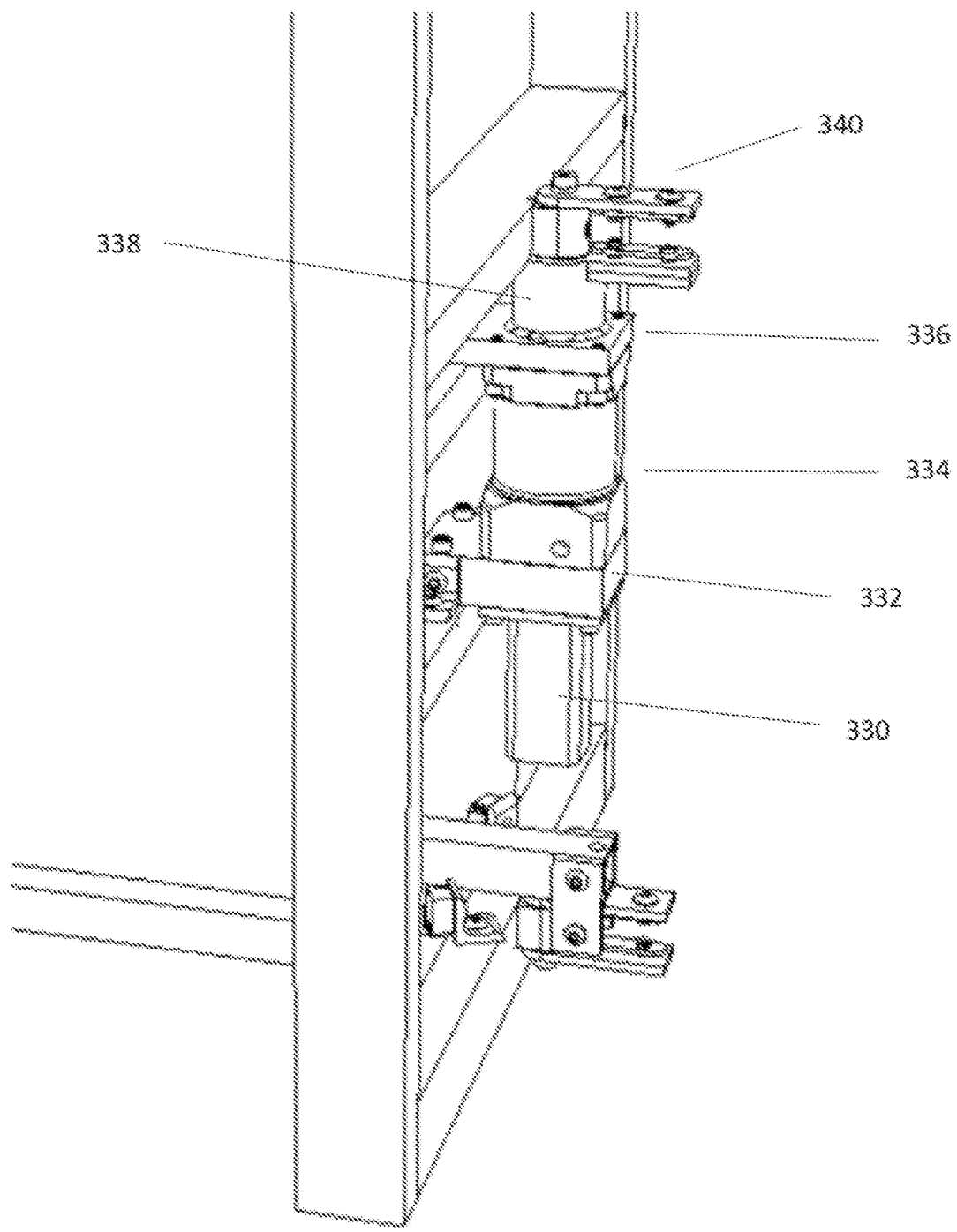
FIG. 3D a schematic depicting a perspective view of an embodiment of a frame and an embodiment of a drive system.

FIG. 3D is a schematic depicting a perspective view of the front of the drive system and lower portion of the actuating support with the swing arms removed from view. Swing arm pivots 340 are welded to the top and bottom horizontal supports. An electric motor 330 fastens to a motor support block 332 and connects to a gearhead 334. The gearhead is rigidly fixed to the actuating support by a gearhead support block 336. A coupler 338 connects to the drive system with the upper swing arm pivot. The coupler and support blocks may be fabricated from 6000 series aluminum round or rectangular bar using a band saw and CNC mill. Electric motor can be sourced from Trinamic Hamburg, Germany; Applied Motion Watsonville, CA; Advanced Motion Control Camarillo, CA; etc. The gearhead can be sourced from Anaheim Automaton Anaheim, CA; Parker, Cleveland, OH; etc.

Figure 4A:
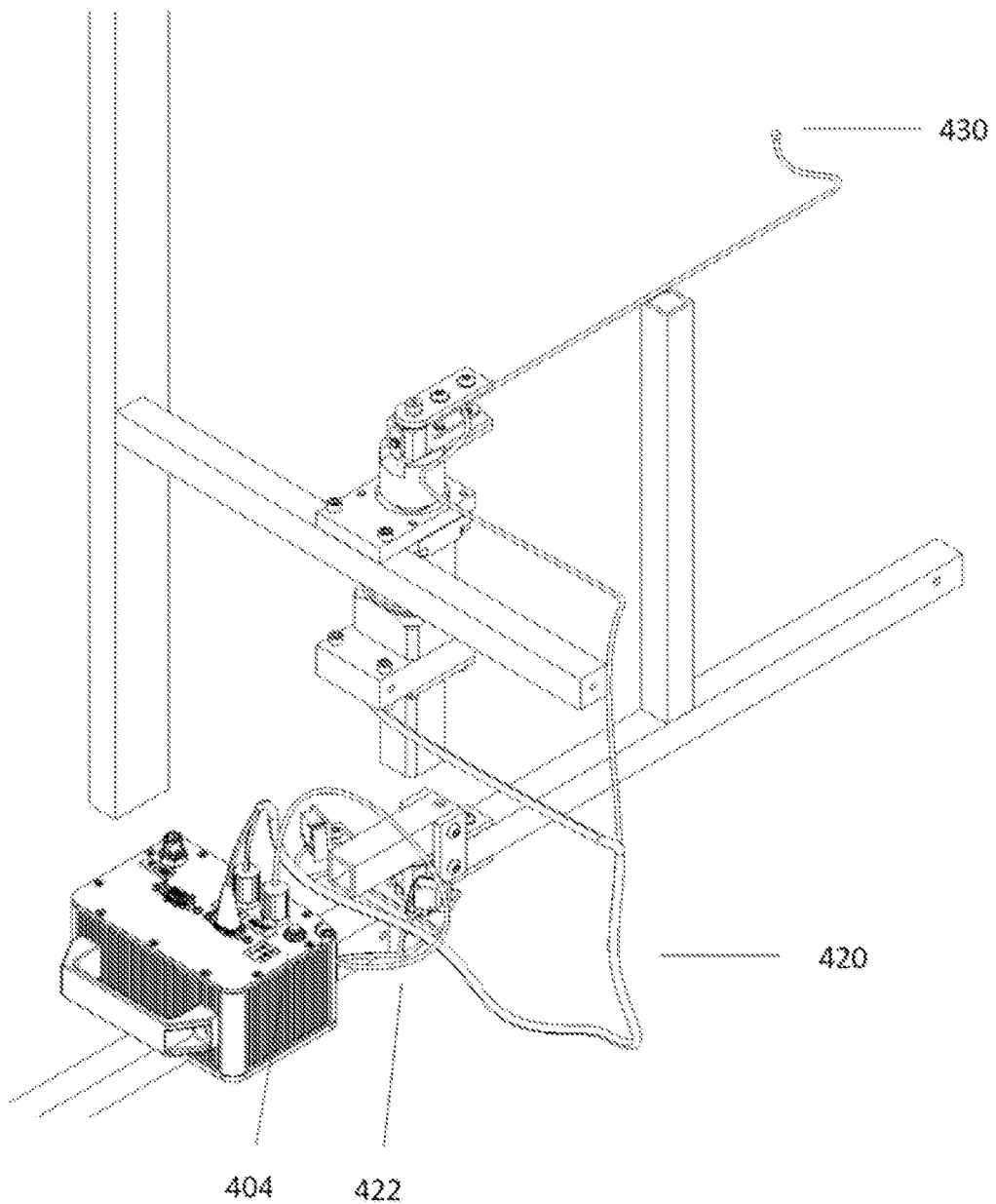
FIG. 4A a schematic depicting a perspective view of an embodiment of a processing system enclosure.

FIG. 4A is a schematic diagram depicting a perspective view of the processing system enclosure 114 and the actuating support 104 where faces of actuating support components (swing arm 301, vertical support 300, horizontal motor support 314 and horizontal gearhead support 316) have been removed to show how wire harnesses route through the actuating support. The drive system/perception system harness 420 routes from the processing system enclosure through the actuating support to the horizontal motor support where it splits. One end routes through the horizontal motor support to the location of the motor. The other end routes through the vertical support, the horizontal gearhead support, and the swing arm. The limit switch wire harness 422 routes through the bottom horizontal support and interconnects both limit switches.

Figure 5:
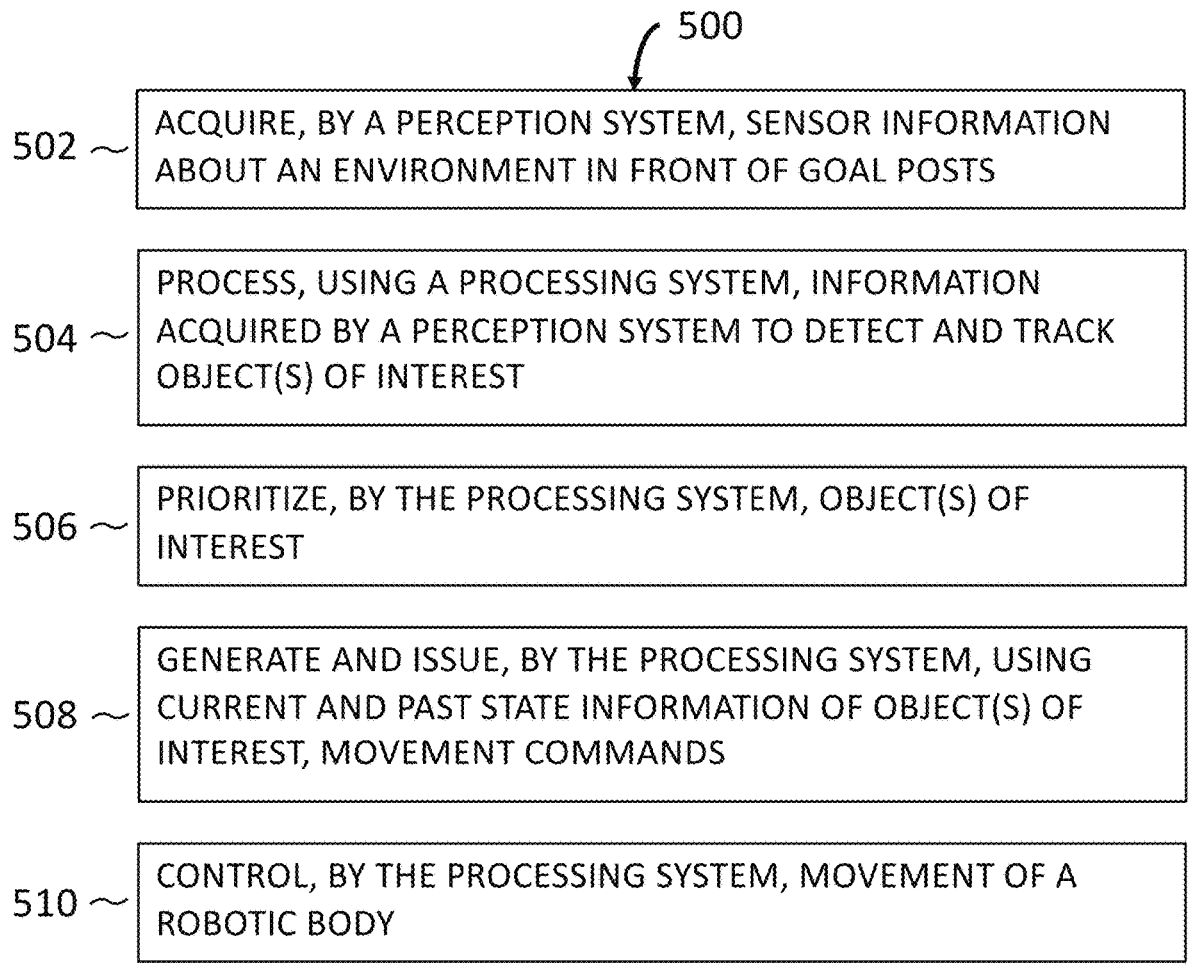
FIG. 5 a flow diagram depicting an embodiment of a method to autonomously position a body of a Robotic Goalkeeper to reduce a shooter's scoring chances.

Description of Methods:

FIG. 5 is a flow diagram depicting an embodiment of a method 500 to autonomously position a body of a Robotic Goalkeeper (e.g., Robotic Goalkeeper 100 and body 102) to reduce a shooter's/player's scoring chances where the Robotic Goalkeeper may include components, such as actuating support 104, body 102, drive train 108, processing system 120 and perception system 122. At 502 a perception system, such as stereo camera 202 collects images of the surroundings in front of, for example, body 102. At 504 a processing system, such as 120 receives and process the information generated by the perception system to determine if there are any Objects of Interest. A computer vision module, such as 122, for example, may be utilized to perform detection and tracking algorithms to find, localize and track Objects of Interest over time. During tracking each detection of an Objects of Interest is associated with a previous detection or identified as a new Object of Interest. In situations where there are multiple shooters and each one has a puck, to be effective, the Robotic Goalkeeper must decide what the priority is. At 506 a method (FIG. 6) to prioritize Objects of Interest is applied. At 508 the processing system generates and issues movement commands that are proportional to the relative movements of the down-selected Objects of Interest. For example, the processing system 120 may issue commands to actuate a drive system, such as 108 to move a body, such as 102. At 510 the movement of the robotic body is monitored by the processing system. For example, processing system 120 may track the torque and rotations of drive system 108 and may also monitor the status of feedback sensor(s) 123.

Figure 6:
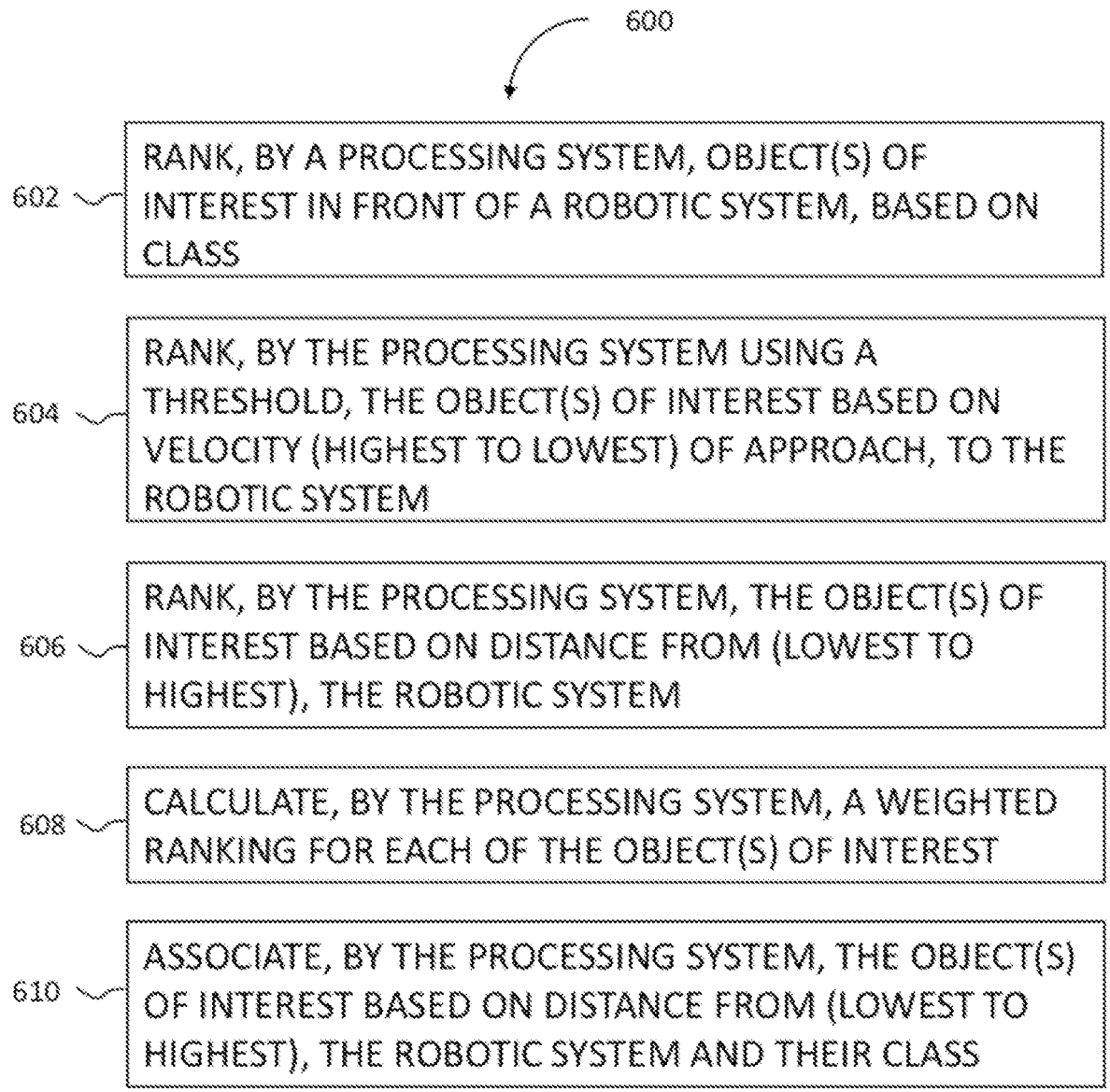
FIG. 6 a flow diagram depicting an embodiment of a method to autonomously prioritize Objects of Interest that are in front of a Robotic Goalkeeper.

FIG. 6 is a flow diagram depicting an embodiment of a method 600 to autonomously prioritize Objects of Interest that are around a Robotic Goalkeeper (e.g., Robotic Goalkeeper 100). Once Objects of Interest have been prioritized, the Robotic Goalkeeper may move a body, such as 102 to reduce the scoring opportunity for the prioritized Objects. In a situation where there are multiple Objects of Interest (e.g., multiple shooters each in possession of pucks), a Robotic Goalkeeper may determine that one set of Objects of Interest (e.g., a shooter and a puck) nearest to said Goalkeeper are the top priority Objects of Interest. In a situation where there are multiple Objects of Interest (e.g., multiple shooters in possession of pucks) and one Object of Interest (e.g., a puck) is moving towards the Robotic Goalkeeper at a high rate of speed, the Robotic Goalkeeper may determine the incoming puck is the top priority Object of Interest. Method 500 and 600 constitute means for a Robotic Goalkeeper to operate autonomously and prioritize Objects of Interest.

At 602 a processing system, such as processing system 120 ranks detected Objects of Interest based on their class (e.g., puck, player, ball, etc.). At 604 the processing system looks for fast moving objects. The speed of Objects of Interest may be determined by a processing system, for example processing system 120 having computer vision module 126 may calculate speed using the data stored by the object track manager 144. At 604 a minimum velocity threshold is applied. If the velocity of any objects approaching the Robotic Goalkeeper are greater than this threshold velocity then the Robotic Goalkeeper sorts the objects based on their velocity highest to lowest. If the velocities of all approaching Objects of Interest are less than the threshold then no rankings are performed on the Objects of Interest. At 606 the processing system ranks the Objects of Interest based on their distance from the Robotic Goalkeeper. This distance may be determined, for example, by perception system 122 and processing system 120. Objects that are the closest to the Robotic Goalkeeper are ranked with a higher priority than those that are further from the system. At 608 the processing system calculates a weighted ranking for the Objects of Interest based on the rankings at steps 602, 604, and 606. Based on these weighted ranking the processing system identifies a singular Object of Interest to be the highest priority. At 610, the perception system determines if the highest-ranking Objects of Interest should be associated with any other Objects of Interest based on their positional offset and class. For example, processing system 120 using perception system 122 may determine the difference in lateral position between the centerline of the body 102 and Objects of Interest. If a puck in front of the body is determined as the highest priority Object of Interest and there is a player located at a similar positional offset, the perception system may associate them as the two highest ranking Objects of Interest.

Figure 7:
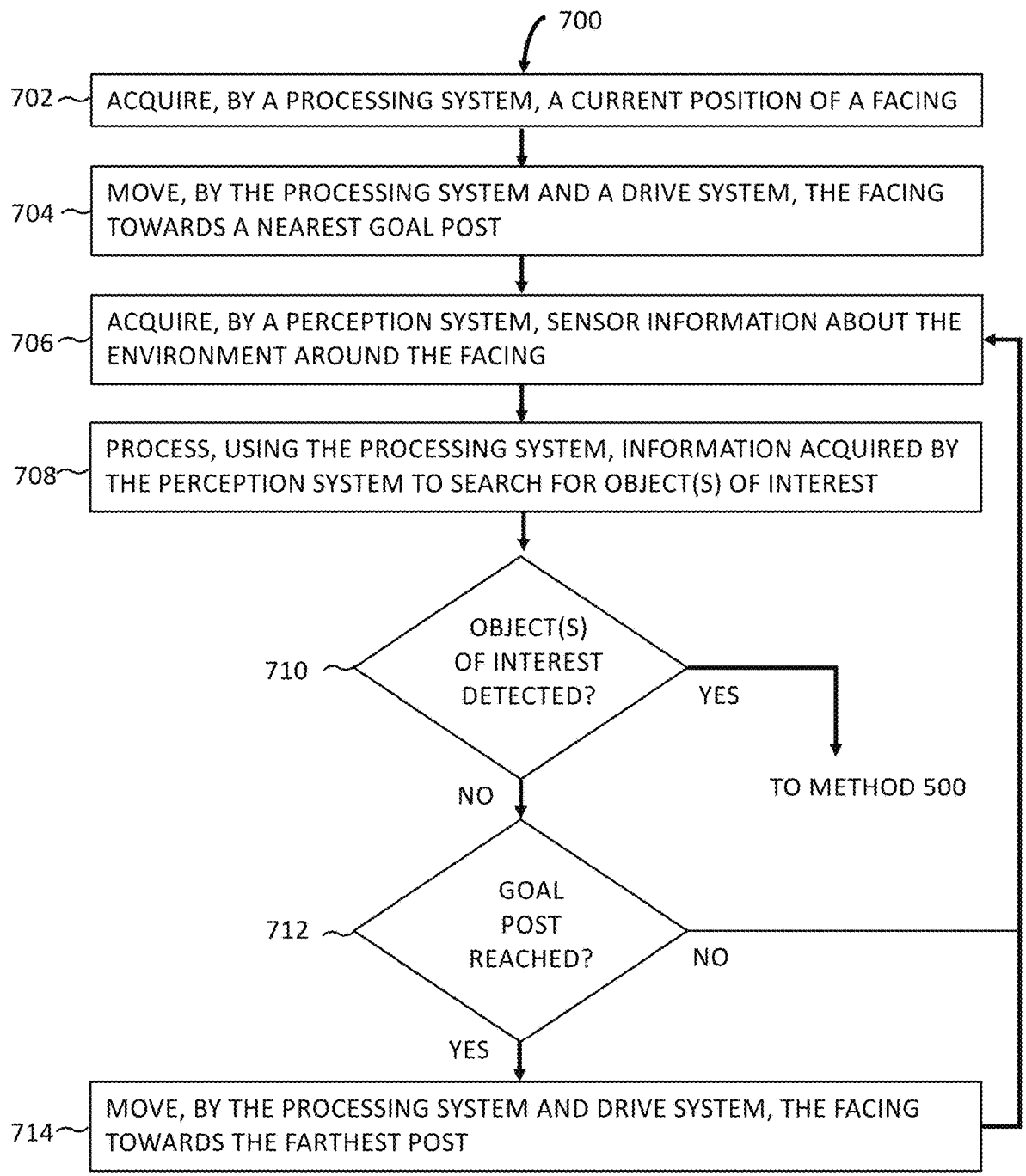
FIG. 7 a flow diagram depicting an embodiment of a method to search in front of goal posts and a Robotic Goalkeeper for Objects of Interest when none are initially detected.

FIG. 7 is a flow diagram depicting an embodiment of a method to search in front of goal posts and a Robotic Goalkeeper (e.g., Robotic Goalkeeper 100 and goal actuating support 104) for Objects of Interest when none are initially detected, where the Robotic Goalkeeper may include components, such as body 102, drive train 108, processing system 120 and perception system 122. Depending on the situation and the embodiment, there may be situations where no Objects of Interest are visible to the Robotic Goalkeeper. For example, consider Robotic Goalkeeper 100 in a situation where a player with a puck is positioned behind the goal frame 106, it would not be able to detect the player or the puck. The field of view of perception system 122 of Robotic Goalkeeper 100 does not include the area behind the goal frame. In situations such as these, a method is needed for Robotic Goalkeepers to search for Objects of Interest. At 702 a processing system determines the position of the body relative to the goal frame. For example, processing system 120 may determine the location of the body 102. At 704 the processing system working with actuators moves the body towards the nearest goal post. For example, processing system 120 may send a command to drive system 108 to rotate the body slowly towards the nearest post. At 706 a perception system, such as stereo camera 202 may collect images of the surroundings in front of, for example, body 102. At 708 a processing system receives and process the information generated by the perception system to determine if there are any Objects of Interest. At 710 the Robotic Goalkeeper checks if an Object of Interest was detected. If any Objects of Interest have been detected, it leaves the method and executes method 500. If no Objects of Interest are detected the Robotic Goalkeeper continues using method 700. At 712 the Robotic Goalkeeper checks if it has reached the nearest goal post, if it has not it returns to 706. If the Robotic Goalkeeper has reached the nearest goal post then it proceeds to step 714. At 714 the processing system working with actuators would move the body towards the opposite goal post. For example, processing system 120 may send a command to drive system 108 to rotate the body slowly towards the opposite post. The Robotic Goalkeeper would then return to step 706. Method 700 constitutes a means for a Robotic Goalkeeper to search for Objects of Interest.

Operation of the First Embodiment of the Apparatus:

To operate the Robotic Goalkeeper 100, it has to be setup on a goal frame, such as 106. The setup will be described herein. After describing the setup of the Robotic Goalkeeper on a goal frame, for illustrative purposes, two ways in which operators (acting as players) may use the system are described. The removal of the Robotic Goalkeeper 100 will also be described, however, it is essentially just the setup process performed in reverse order. Because the Robotic Goalkeeper acts as an autonomous goalkeeper once setup and turned on, there are innumerable ways in which operators may use it, for example in practice, scrimmages or games. FIG. 8D, FIG. 8E, and FIG. 8F are therefore non-limiting explanations of the operation and use of Robotic Goalkeeper 100. It should be noted that while all the figures in this section 8A-F pertain to the sport of hockey alternative embodiments of Robotic Goalkeeper 100 may easily be configured for other sports; therefore, the operative descriptions provided are non-limiting.

Figure 8A:
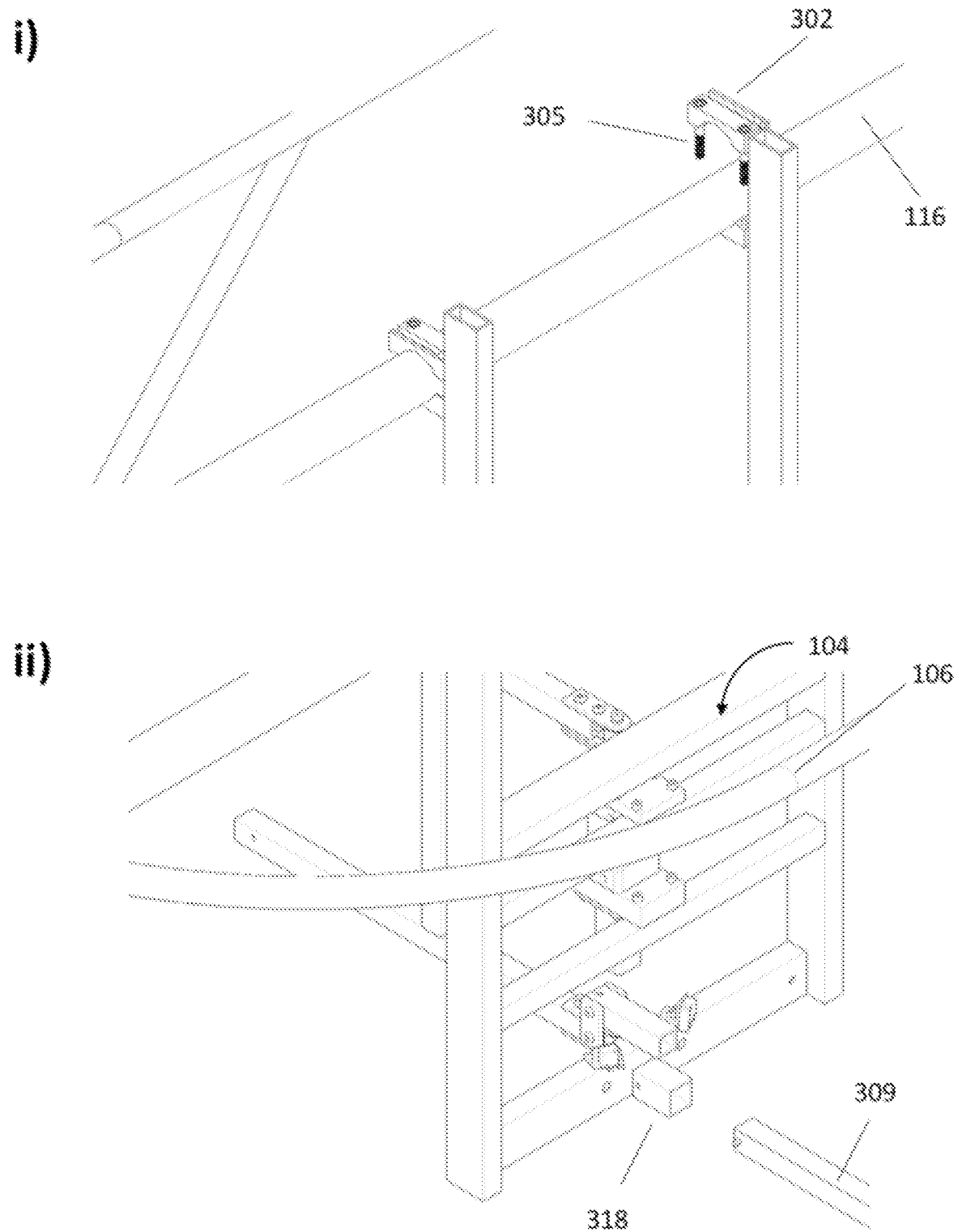
FIG. 8A a schematic depicting the setup of an embodiment of a frame prior to operation.

FIG. 8A is a schematic depicting multiple views of the setup of Robotic Goalkeeper 100 with actuating support 104 and the goal frame 106 during the setup process where the first steps of the setup are shown. Note that FIG. 8A only depicts the components that are necessary to explain the setup process at each step. In step i), the crossbar clamps 302 are connected to the crossbar using the crossbar clamp fasteners 305 and a hex wrench (not shown). During step i) the crossbar clamps fasteners are tightened until the inner diameters of the crossbar clamps are slightly larger than the diameter of the crossbar 116 while still allowing the clamps to freely slide axially along the crossbar. In step ii) the telescoping rear support inner tube 309 is snapped into the socket 318 located on the bottom horizontal support 306. An operator may insert the telescoping rear support inner tube 309 into socket 318 by depressing the spring snap button connector 311 and pushing the components together.

Figure 8B:
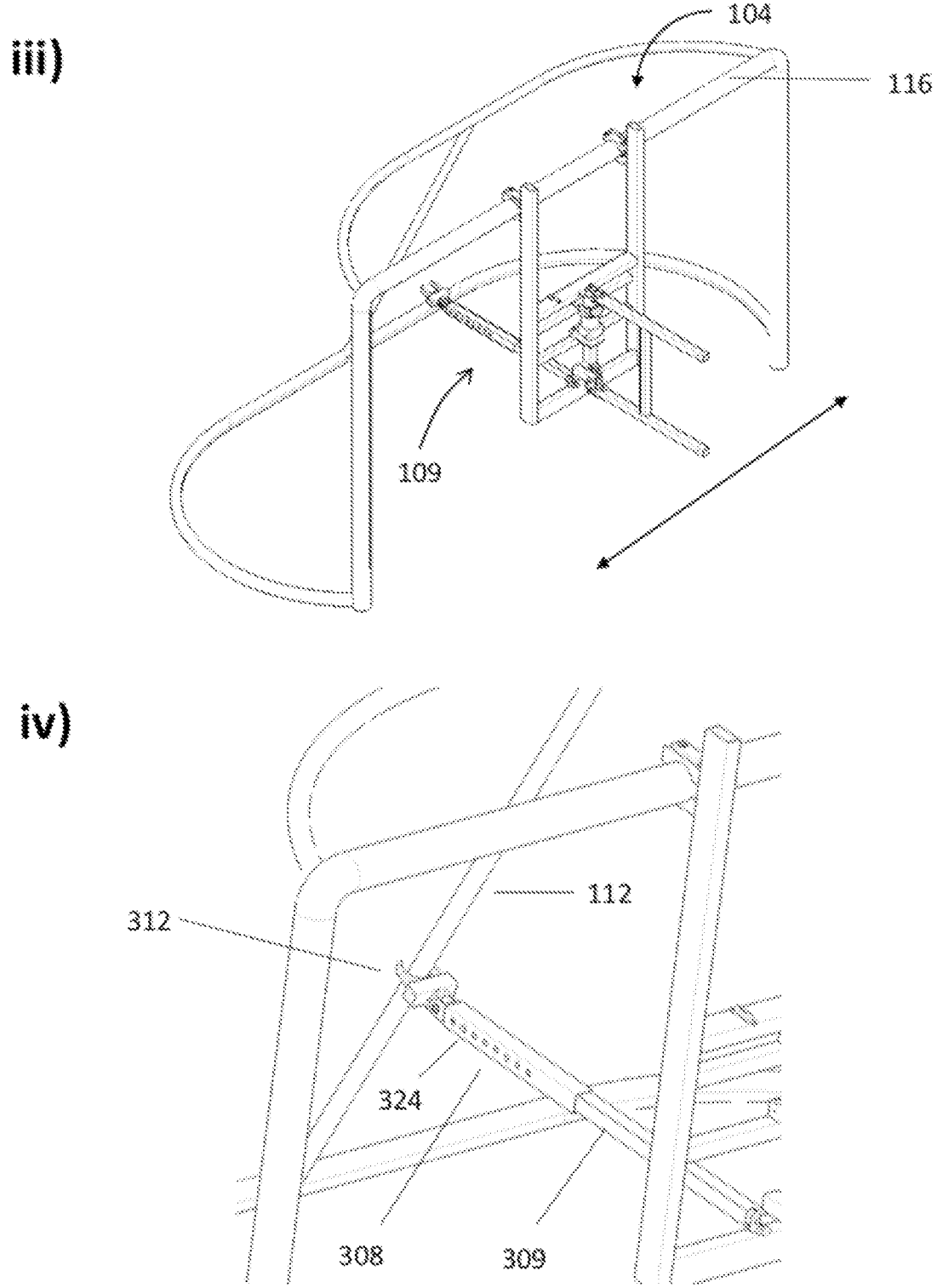
FIG. 8B a schematic depicting the setup of an embodiment of a frame prior to operation.

FIG. 8B, is a schematic depicting two views of the Robotic Goalkeeper 100, actuating support 104, and the goal frame 106 during the setup process where two steps of the setup are shown. Note that FIG. 8B only depicts the components that are necessary to explain the setup process at each step. In step iii) the actuating support 104 is centered on the cross bar 116 using the rear goal post 112 and the telescoping rear support assembly 109 as guides. In step iv) the telescoping rear support assembly 109 is adjusted to the correct length for the dimensions of the goal frame such that the vertical supports 300 are perpendicular to the crossbar and the rear clamp 312 is snapped in place onto the rear post. To adjust the length of the telescoping rear support assembly an operator depresses the spring snap button connector 324 and adjusts 309 until the assembly is configured to the desired length. The operator then releases the snap button connector and makes slight adjustments to the position of 309 such that the snap button connector pops through a hole in the outer tube 308.

Figure 8C:
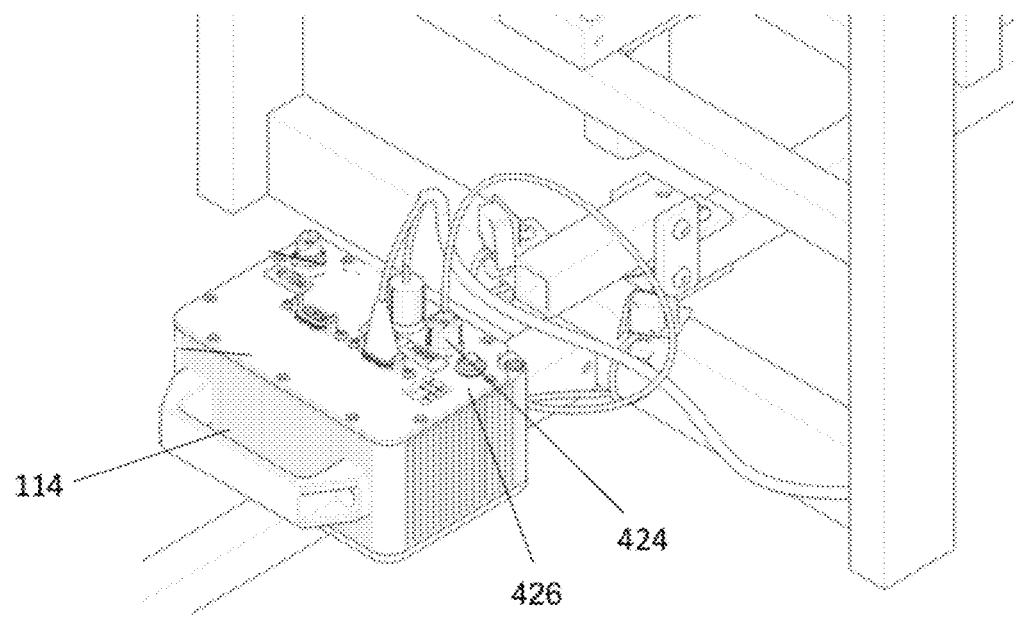
FIG. 8C a schematic depicting the setup of an embodiment of a frame prior to operation.
Figure 8C:
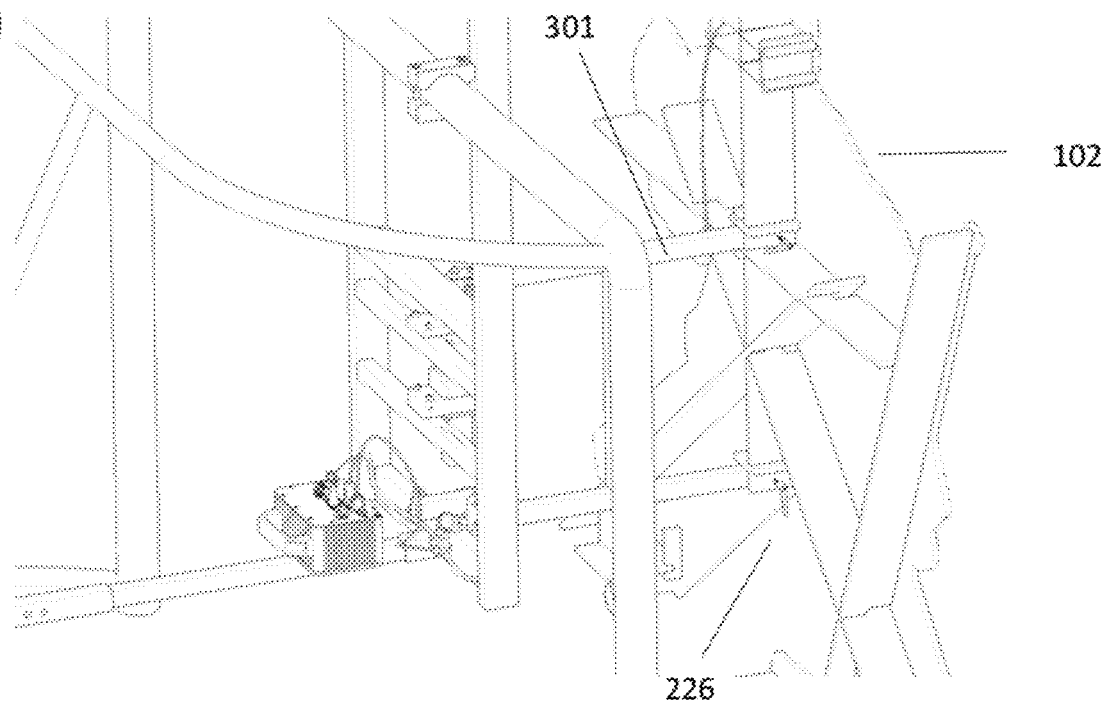
Figure 8D:
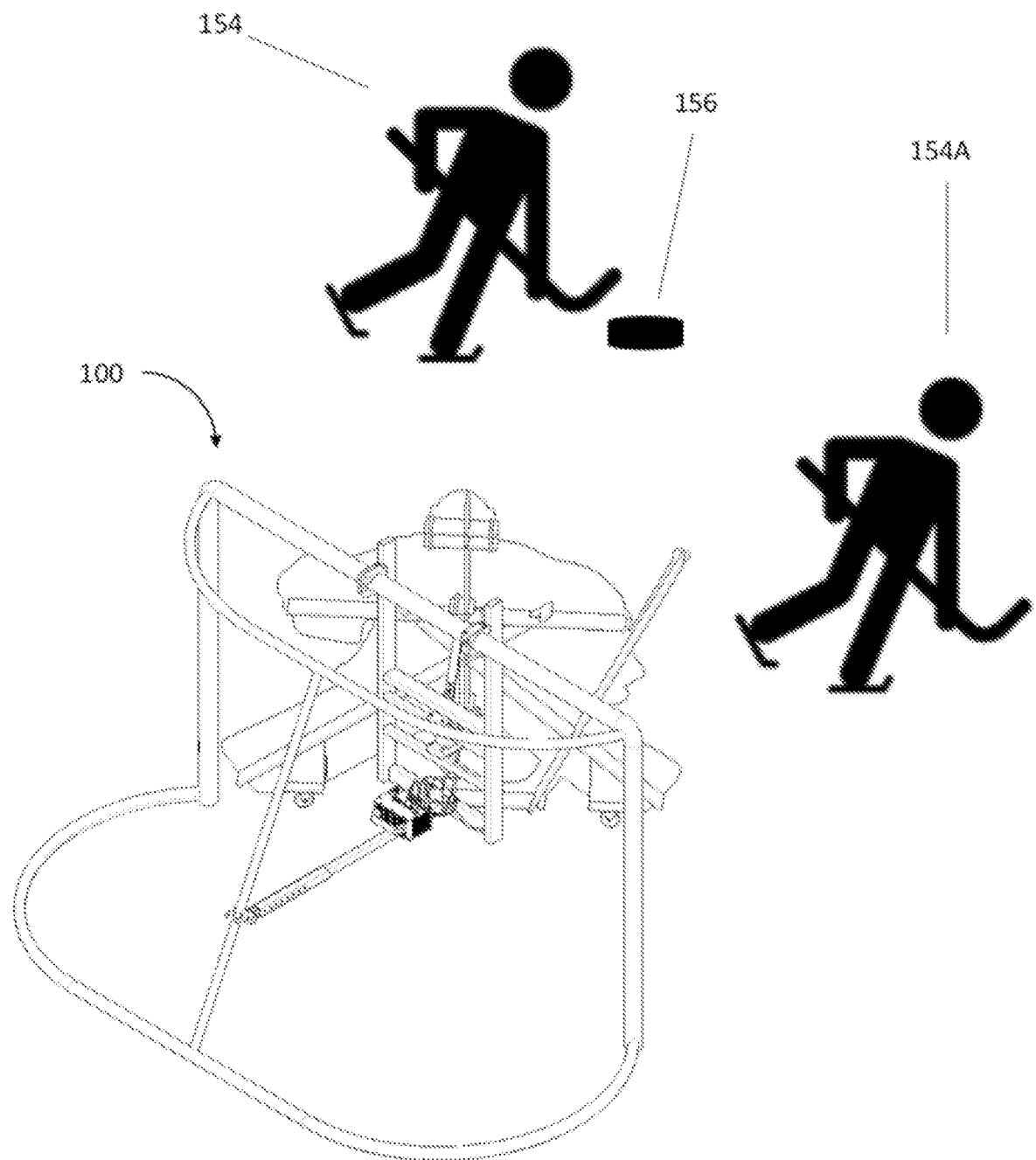
FIG. 8D a schematic depicting the operation of an embodiment of a Robotic Goalkeeper with two players and a puck.
Figure 8E:
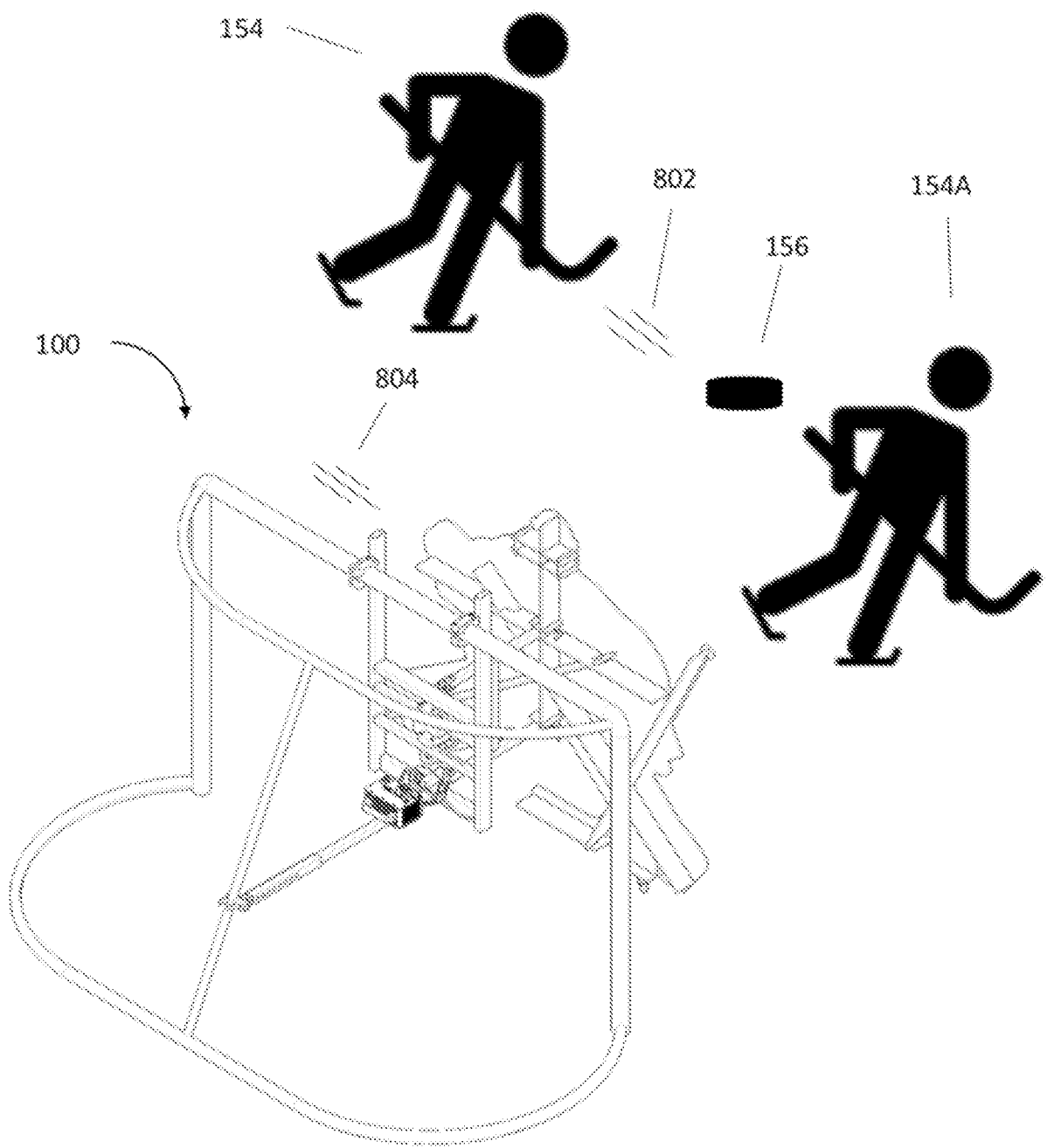
FIG. 8E a schematic depicting the operation of an embodiment of a Robotic Goalkeeper with two players where a puck has been passed from one player towards the second.
Figure 8F:
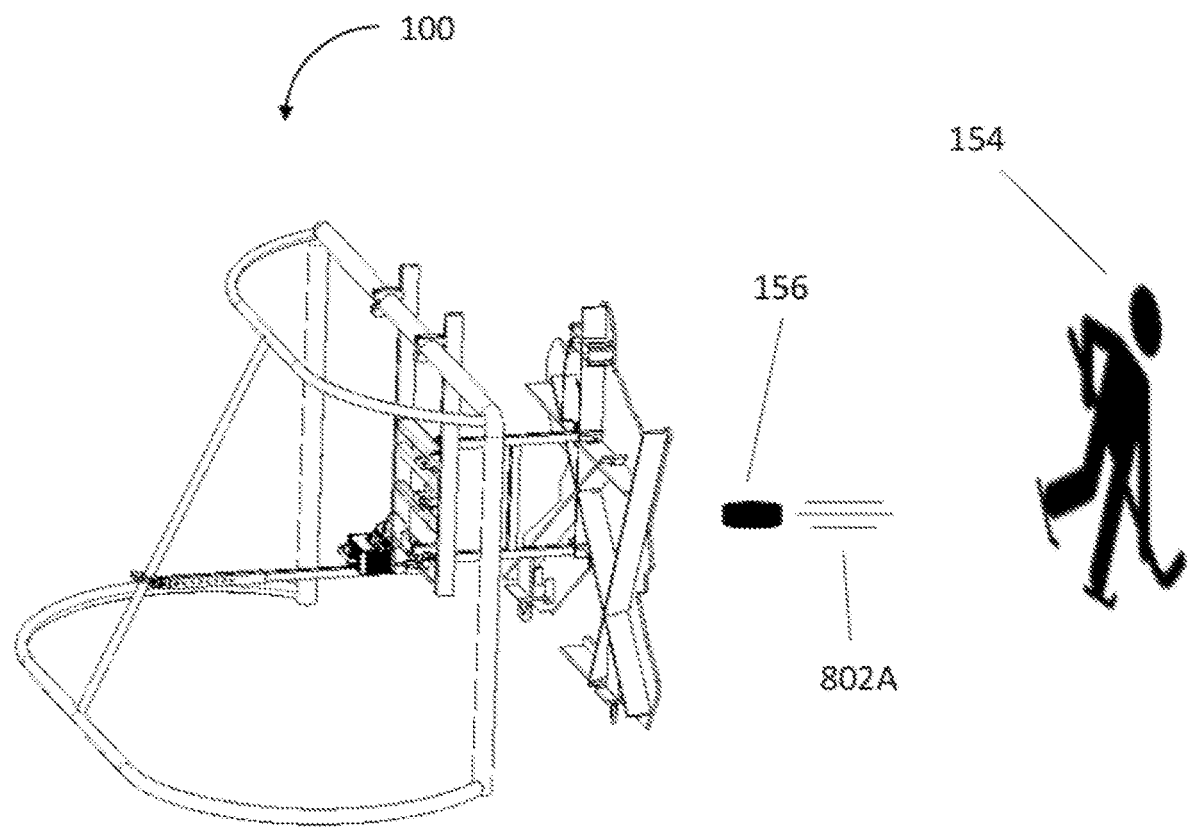
FIG. 8F a schematic depicting the operation of an embodiment of a Robotic Goalkeeper with a player shooting a puck at a goal frame.

FIG. 8C is a schematic depicting two views of the Robotic Goalkeeper 100 where the final steps of the setup are shown. Note that FIG. 8C only depicts the components that are necessary to explain the setup process at each step. In step v) the processing system enclosure 114, and the processing system 120 is electrically coupled with the actuating support and perception system with wire harnesses 115 and electrical connectors 424. In step vi) the body 102 is fitted up against the ends of the swing arms 301 and is attached to the swing arms 110 using body fasteners 226.

After setup the Robotic Goalkeeper is plugged in and turned on. The Robotic Goalkeeper may start up all necessary applications, run system checks, home its drive system, and finally begin moving to block shots. The Robotic Goalkeeper 100 may be plugged into the wall or operated on battery power. Because the Robotic Goalkeeper is autonomous, operator(s) are not generally required to do anything after setup and turn on; thus, they are free be player(s).

FIG. 8D and FIG. 8E are schematics depicting perspective views of the Robotic Goalkeeper 100, the goal frame 106, an operator 154, an operator 154A, and a puck 156, that shows how the system may be used. Note that FIG. 8D is a schematic depicting the situation prior to a pass (Objects of Interest are not in motion). FIG. 8E is a schematic depicting the situation after a pass (Objects of Interest are in motion). In FIG. 8D the operator 154 has possession of the puck and the body 102 is appropriately positioned to block a potential shot originating from operator 154. Operator 154A is positioned on the opposite side of the goal frame 106 as operator 154. In FIG. 8E the puck and the body are in motion, and the movement of the puck 802 is proportionally matched by the movement of the body 804. Between the static and dynamic states (FIG. 8D and FIG. 8E), the Robotic Goalkeeper autonomously perceived the motion of the puck 156 and acted accordingly.

FIG. 8F is a schematic depicting a perspective view of the Robotic Goalkeeper 100, the goal frame 106, and the operator 154 that shows how the system is operated when the operator tries to score a goal. Note that FIG. 8F is a schematic depicting a situation after an operator 154 has shot the puck towards the goal frame in an attempt to score. Note the position of the body with respect to the shooter and the puck is such that the body is blocking the shooter.

Figure 9A:
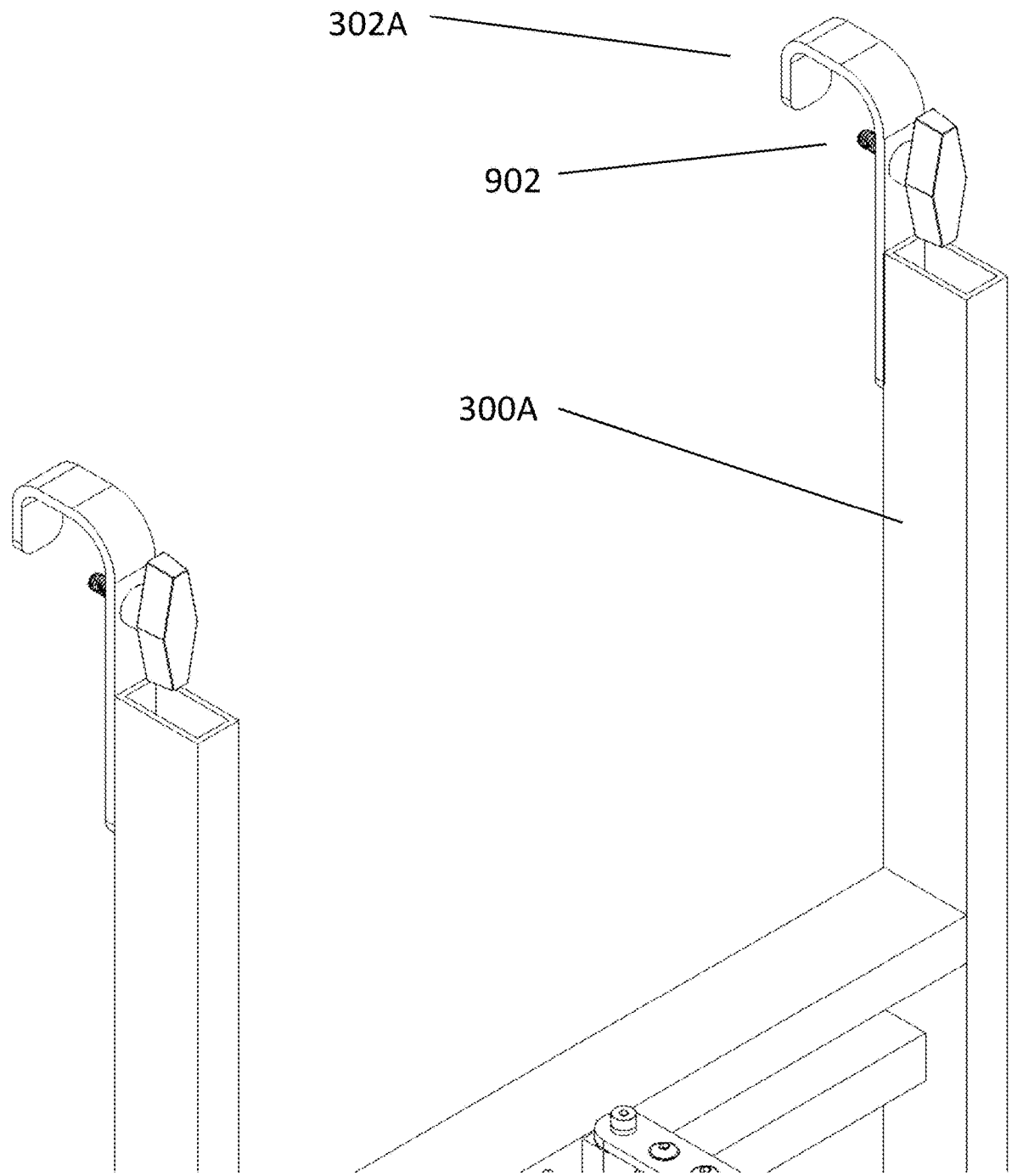
FIG. 9A a schematic depicting an alternative embodiment of a crossbar clamp.

Removal of the setup is done as follows. First, the Robotic Goalkeeper 100 is turned off by pressing the pushbuttons 404 located on the processing system enclosure 114. If connected to a wall power source the system is unplugged. Then the body 102 is removed from the swing arm assembly 110 using body fasteners 226. The rear clamp 312 is removed from the rear goal post 112. The processing system enclosure is disconnected from the electrical connectors 113. The crossbar clamps are opened using a hex tool and the actuating support 104 is finally removed from the goal posts.
Alternative Embodiments FIG. 9 is an alternative embodiment of a crossbar clamp 302A affixed to a vertical support 300A having a hook style body where the clamping surface consists of two vertical surfaces separated by a horizontal surface. The length of the horizontal surface defines the opening size of the clamp. It is approximately 2.65" wide and configured to rest on top of a crossbar. Once placed on a crossbar a hand operable fastener 902 reduces the size of the clamp opening and forces the crossbar against one of the vertical surfaces.

Figure 10A:
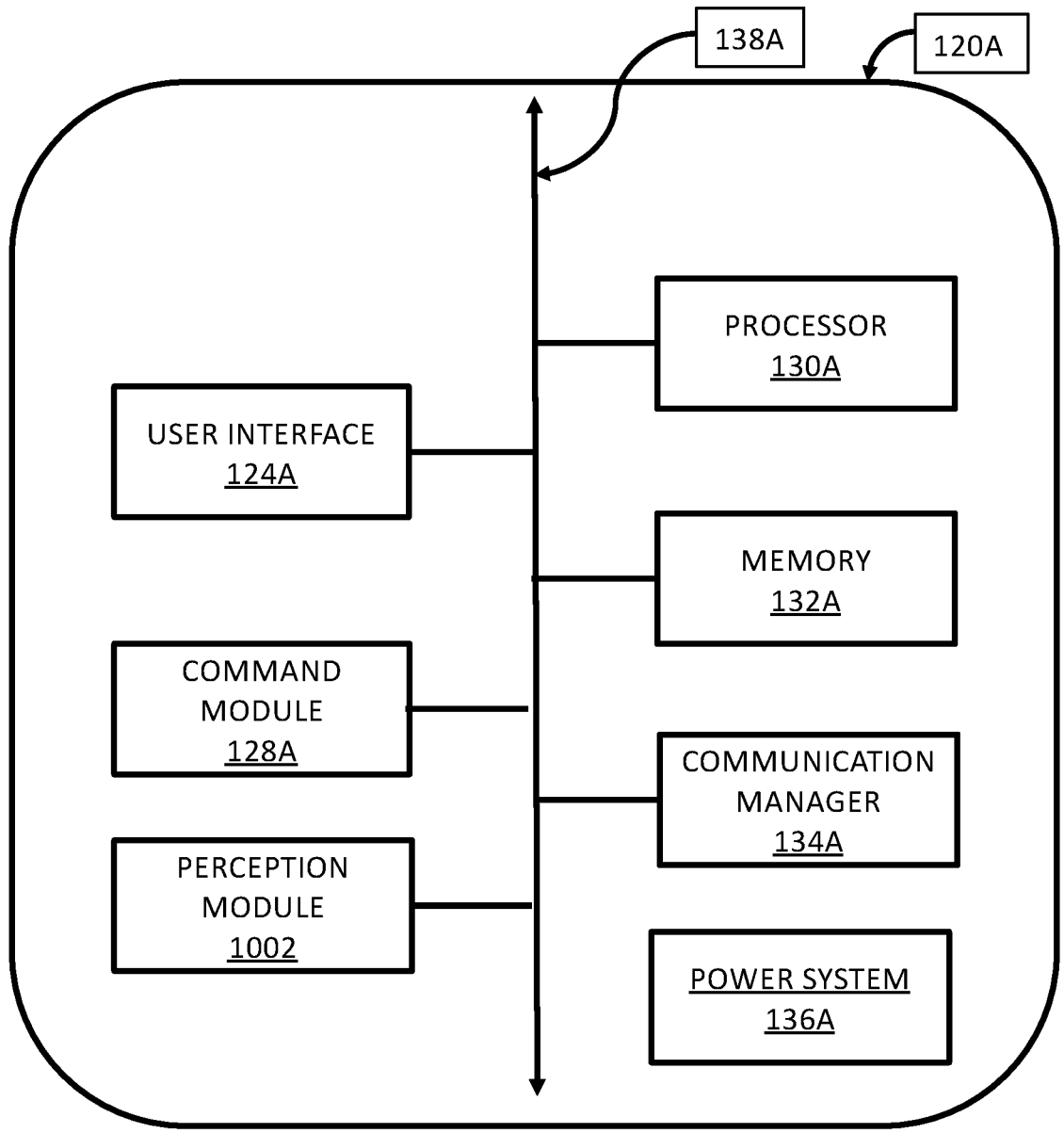
FIG. 10A a block diagram depicting an alternative embodiment of a processing system with a perception module.

An alternative embodiment of a processing system 120A is illustrated in FIG. 10A where the embodiment is configured to allow for the use of a multitude of embodiments of perception systems. The processing system 120A has a perception module 1002 instead of a computer vision module (e.g., computer vision module 126). Because information streams from the perception system may contain images as well as additional sensor data (e.g., laser rangefinder, ultrasonic rangefinder), the perception module is configured to process additional data streams.

Figure 10B:
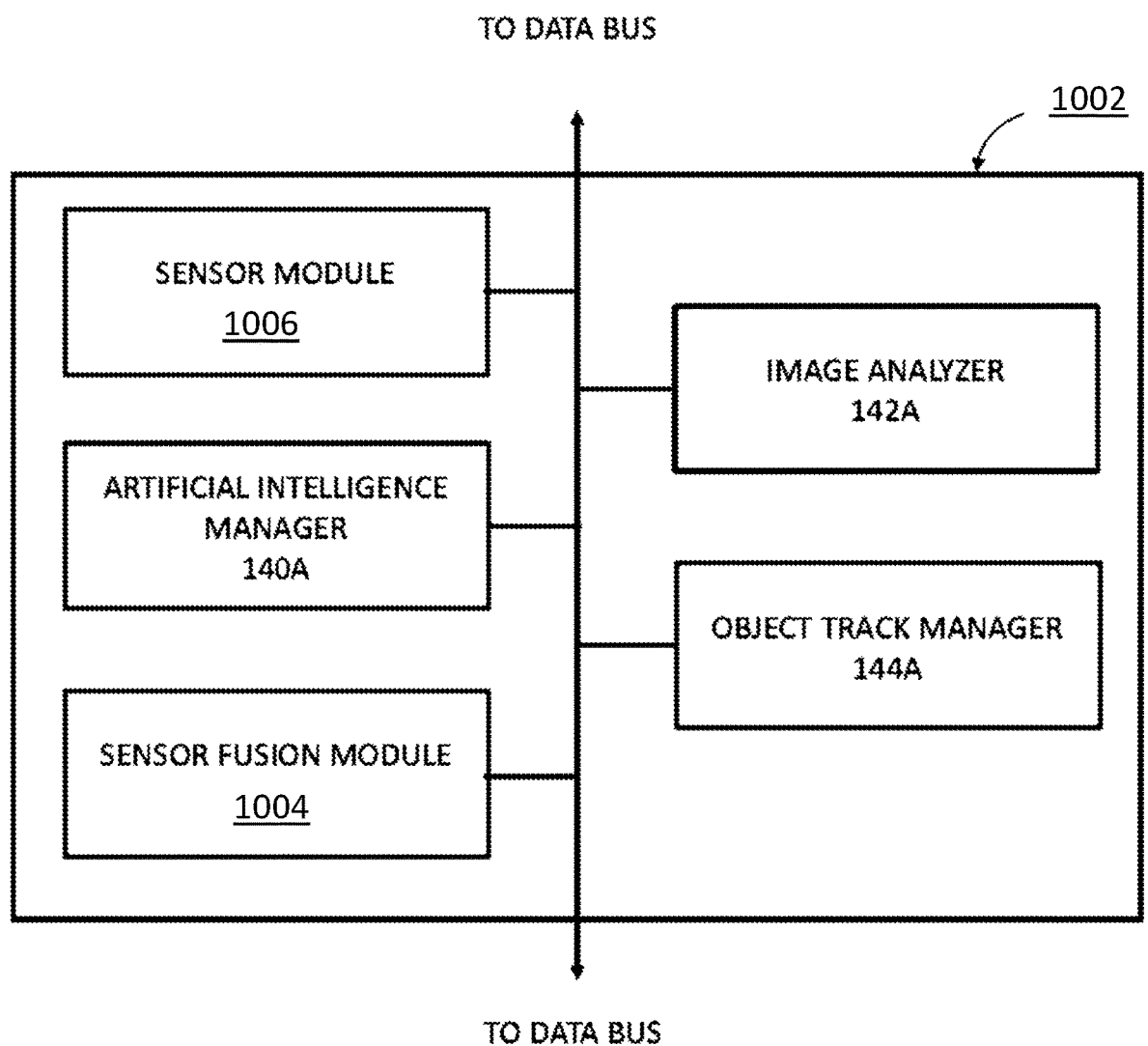
FIG. 10B a block diagram depicting an embodiment of a perception module.

FIG. 10B depicts an embodiment of the perception module 1002 configured to process a multitude of different data streams. The perception module consists of an artificial intelligence manager 140A, a sensor module 1006, an image analyzer 142A, an object track manager 144A and a sensor fusion module 1004. The sensor module is configured to extract useful information from non-vision-based perception system sensors. The sensor fusion module is configured to combine information from the image analyzer and the sensor module to improve the certainty of the information.

Figure 10C:
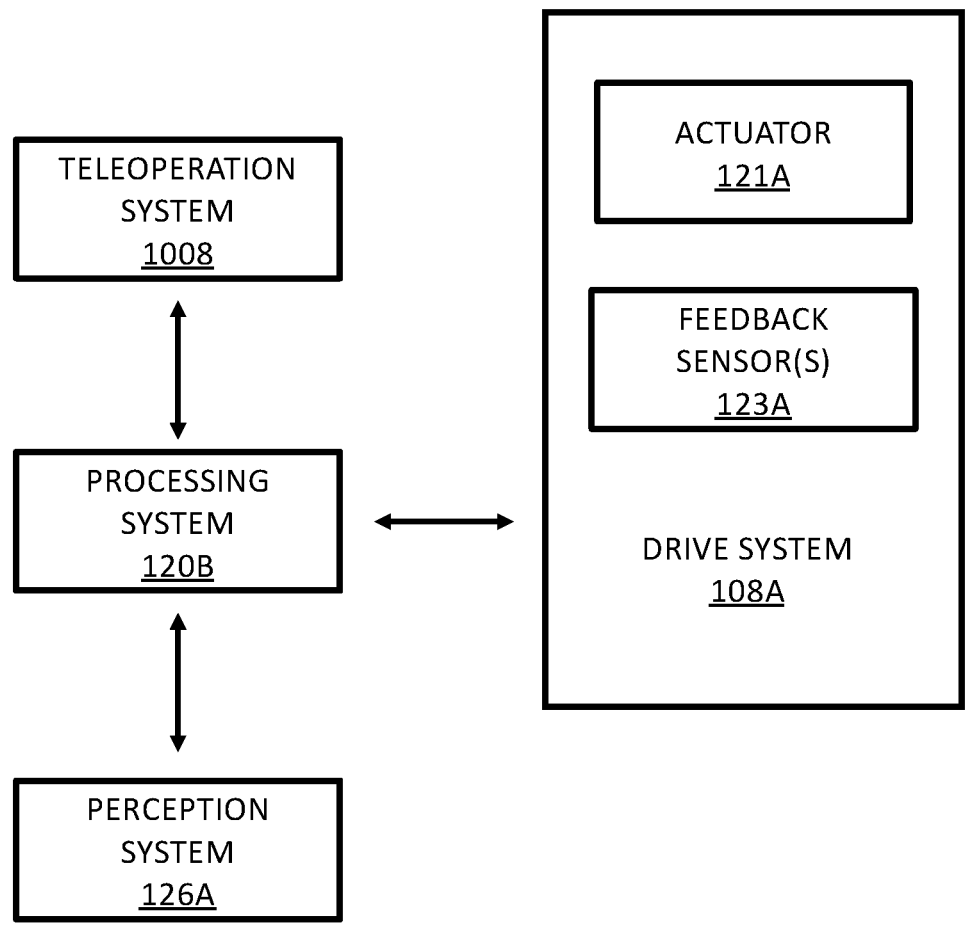
FIG. 10C is a block diagram depicting the electrical coupling of an embodiment of a Robotic Goalkeeper between a Perception system, a processing system and a drive system.

FIG. 10C is a block diagram depicting a bidirectional electrical coupling of a drive system 108A, a processing system 120B, a teleoperation System 1008 and a perception system 126A. The drive system is comprised of an actuator 121A and feedback sensor(s) 123A. The drive system executes commands issued to it by the processing system. When it receives a command the drive system articulates the actuator and returns information from the feedback sensors 123A. The teleoperation system 1008, receives and transmits signals to/from a remote operator. The processing system via the inline drive system 108A, coordinates the position and/or motion of the body in accordance with commands issued from a teleoperator. The perception system is comprised of a camera and provides information about the robot's point of view to the processing system. The processing system may pass this information to a teleoperator and/or a storage device. The teleoperator may transmit commands to the teleoperation system with a handheld device such as a joystick or controller typically used with video games.

Figure 10D:
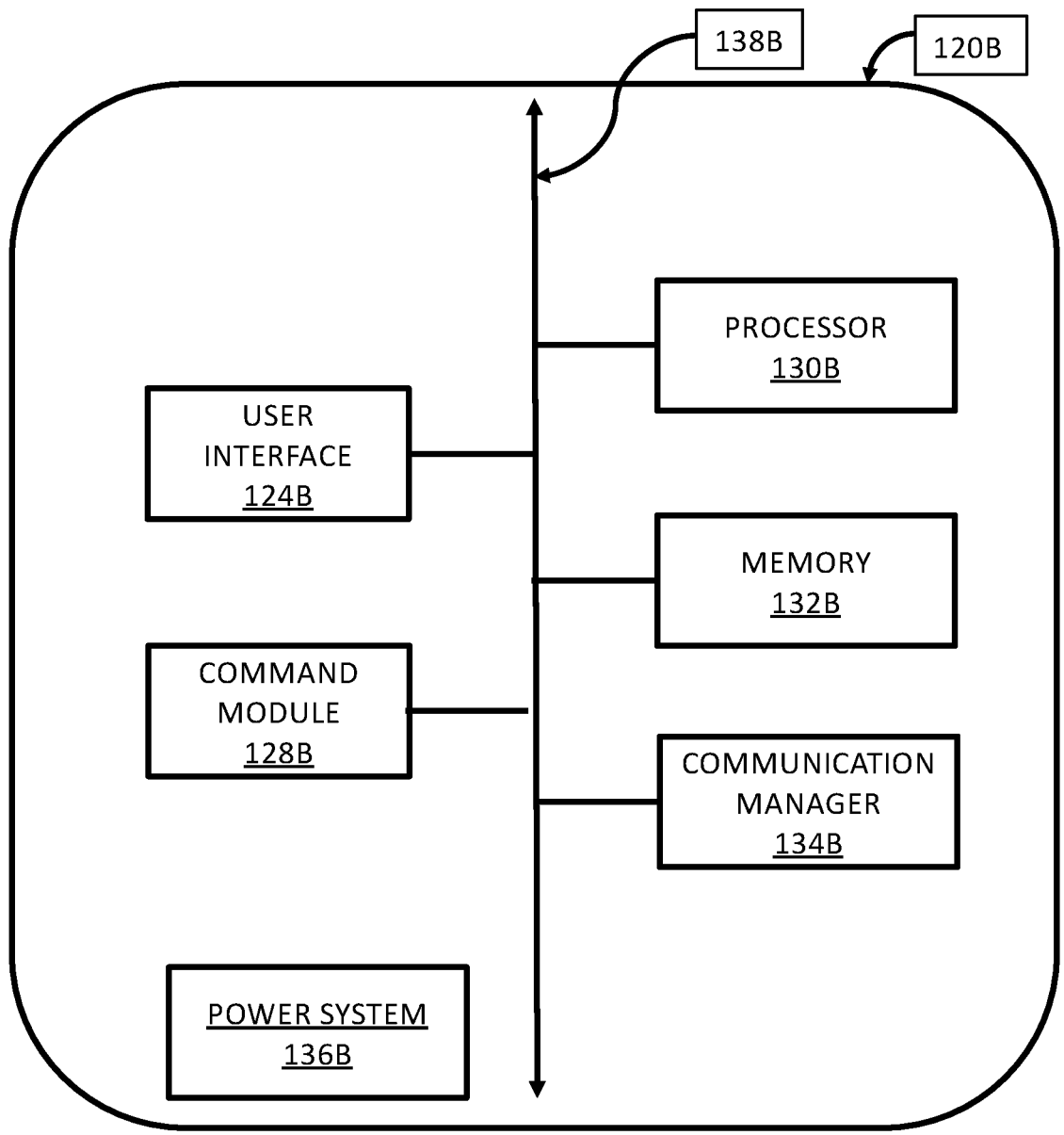
FIG. 10D is a block diagram depicting an embodiment of a processing system with teleoperation operation capabilities.

FIG. 10D is a block diagram depicting an embodiment of the processing system 120B that may be used to implement certain functions of a Robotic Goalkeeper with a teleoperation system, such as 1008. A user interface 124B, a processor 130B, memory 132B, a power system 136B, and a data bus 138B, form a foundation for the processing system. With this foundation, the other components of the processing system 120B (a command module 128B and a communication manager 134B) process data received from the teleoperation system 1002 to control a drive system, such as 108.

I claim:

1. A training apparatus comprising:
   a body configured to form a partial obstruction in front of a mouth of a sports goal frame;
   an actuating support;
   wherein said actuating support has at least two vertical structural members each having a top end and a bottom end and at least two horizontal structural members, each having two ends said horizontal structural members arranged between said vertical members such that the ends of each horizontal member affix to a side of each vertical member, wherein one of the horizontal members adjoins the vertical members near their bottom ends and another of the horizontal members adjoins the vertical members closer to their top ends than their bottom ends;
   wherein said actuating support has a drive system having means for rotating said body about a vertical axis parallel to goal posts of said sports goal frame and means for affixing said drive system to said horizontal structural members;
   wherein said actuating support has means for removably affixing said vertical structural members to a crossbar of said sports goal frame;
   wherein said actuating support has a swing arm assembly with at least one structural member configured as a swing arm, wherein said swing arm has means for affixing said swing arm to said body, and means for pivotally affixing said swing arm to at least one said horizontal member;
   wherein said actuating support has means for mechanically coupling said swing arms to said drive system;
   wherein said actuating support has a rear support affixed to the horizontal structural member near the bottom end of said vertical structural members, said rear support configured to extend normal to a plane defined by said mouth and opposite said swing arm, and having means for removably affixing said rear support to a rear goal post of said sports goal frame.

2. The apparatus of claim 1, further including a processing system and a perception system in operable communication with said actuating support, wherein said perception system has means for collecting information about objects of interest in front of or circumjacent said sports goal frame, wherein said processing system has means for processing information from said perception system to autonomously coordinate the rotation of said body.

3. The apparatus of claim 2, wherein said processing system has means for processing commands received from a teleoperator.

4. The apparatus of claim 2, wherein said means for collecting information about objects of interest in front of or circumjacent to said sports goal frame is a stereo camera.

5. The apparatus of claim 2, wherein said processing system has means for prioritizing objects of interest.

6. The apparatus of claim 2, wherein said processing system has means for searching for objects of interest.

7. The apparatus of claim 1, further including limit switches affixed to one of the horizontal structural members and configured to detect contact of said swing arm.

8. The apparatus of claim 1, wherein said means for rotating said body about the vertical axis includes an electric motor and gearhead.

9. The apparatus of claim 1, said means for removably affixing said vertical structural members to said crossbar comprises clamps.

10. The apparatus of claim 1, wherein said rear support has means for expanding or contracting whereby the actuating support may attach to goal frames having different dimensions.

11. The apparatus of claim 10, wherein said means for expanding or contracting comprises a plurality of telescoping structural members and means for being fixed at a desired length.

12. The apparatus of claim 1, wherein said means for removably affixing said rear support to said rear goal post comprises a rear clamp pivotally attached to said rear support.

13. The apparatus of claim 1, wherein said body has a cutout configured to form a window for a camera.

14. The apparatus of claim 1, wherein said means for affixing said swing arm to said body removably attaches said body to said swing arm.

15. The apparatus of claim 1, wherein said body has means for travel over a surface of play.

* * * * *